US010460738B2

(12) United States Patent
Baeckstroem et al.

(10) Patent No.: US 10,460,738 B2
(45) Date of Patent: Oct. 29, 2019

(54) ENCODING APPARATUS FOR PROCESSING AN INPUT SIGNAL AND DECODING APPARATUS FOR PROCESSING AN ENCODED SIGNAL

(71) Applicant: Fraunhofer-Gesellschaft zur Foerderung der angewandten Forschung e.V., Munich (DE)

(72) Inventors: Tom Baeckstroem, Helsinki (FI); Florin Ghido, Nuremberg (DE); Johannes Fischer, Bammersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 247 days.

(21) Appl. No.: 15/457,547

(22) Filed: Mar. 13, 2017

(65) Prior Publication Data

US 2017/0270941 A1    Sep. 21, 2017

(30) Foreign Application Priority Data

Mar. 15, 2016  (EP) .................................... 16160369
Sep. 21, 2016  (EP) .................................... 16189893

(51) Int. Cl.
*G10L 19/00* (2013.01)
*G10L 19/02* (2013.01)
(Continued)

(52) U.S. Cl.
CPC ........ *G10L 19/0212* (2013.01); *G10L 19/005* (2013.01); *G10L 19/035* (2013.01); *G10L 19/038* (2013.01); *H04L 67/12* (2013.01)

(58) Field of Classification Search
CPC ................................. G10L 19/07; G10L 19/12
(Continued)

(56) References Cited

U.S. PATENT DOCUMENTS 5,666,465 A * 9/1997 Ozawa ..................... G10L 19/07
  704/222
6,345,246 B1 * 2/2002 Moriya ................. G10L 19/008
  704/219

(Continued)

FOREIGN PATENT DOCUMENTS

EP    0858067 A2    8/1998
EP    0658876 B1    9/1999
(Continued)

OTHER PUBLICATIONS

3GPP TS 26.190, "3rd Generation Partnership Project; Technical Specification Group Services and System Aspects; Speech codec speech processing functions; Adaptive Multi-Rate-Wideband (AMR-WB) speech codec; Transcoding Functions (Release 7)," V7.0.0, Jun. 2007, 53 pages.

(Continued)

*Primary Examiner* — Daniel Abebe
(74) *Attorney, Agent, or Firm* — Perkins Coie LLP; Michael A. Glenn

(57) ABSTRACT

Disclosed is an apparatus for processing an input signal, having a perceptual weighter and a quantizer. The perceptual weighter has a model provider and a model applicator. The model provider provides a perceptual weighted model based on the input signal. The model applicator provides a perceptually weighted spectrum by applying the perceptual weighted model to a spectrum based on the input signal. The quantizer is configured to quantize the perceptually weighted spectrum and for providing a bitstream. The quantizer has a random matrix applicator and a sign function calculator. The random matrix applicator is configured for applying a random matrix to the perceptually weighted spectrum in order to provide a transformed spectrum. The sign function calculator is configured for calculating a sign function of components of the transformed spectrum in (Continued)

order to provide the bitstream. The invention further refers to an apparatus for processing an encoded signal and to corresponding methods.

19 Claims, 10 Drawing Sheets

(51) Int. Cl.
    *G10L 19/038*     (2013.01)
    *G10L 19/005*     (2013.01)
    *G10L 19/035*     (2013.01)
    *H04L 29/08*     (2006.01)

(58) Field of Classification Search
    USPC ........................................................ 704/222
    See application file for complete search history.

(56) References Cited

U.S. PATENT DOCUMENTS

| | | | |
|---|---|---|---|
| 7,835,904 B2 | 11/2010 | Li et al. | |
| 2003/0154953 A1* | 8/2003 | Yasui | F02D 41/1479 123/205 |
| 2012/0314877 A1 | 12/2012 | Ojala | |

FOREIGN PATENT DOCUMENTS

| | | |
|---|---|---|
| RU | 2402826 C2 | 10/2010 |
| WO | 2011/076285 A1 | 6/2011 |

OTHER PUBLICATIONS

3GPP TS 26.445, "3rd Generation Partnership Project; Technical Specification Group Services and Systems Aspects; Codec for Enhanced Voice Services (EVS); Detailed Algorithmic Description (Release 12)," v12.0.0, Sep. 2014, 625 pages.
ISO/IEC FDIS 23003-3, "Information Technology—MPEG Audio Technologies—Part 3: Unified Speech and Audio Coding," Jan. 23, 2012, 286 pages.
ISO/IEC JTC 1/SC 29N 147, "Final Text for DIS 11172-1 (rev. 2) : Information Technology-Coding of Moving Pictures and Associated Audio for Digital Storage Media—Part 1 Coding at up to about 1.5 Mbit/s (ISO/IEC JTC 1/SC 29/WG 11 N 0156) [MPEG 92]—Section 3 Audio ED—International Standards Organization," XP002083108, Apr. 20, 1992, 168 pages.
NTT-AT, "Super Wideband StereoSpeech Database," ntt-at.com, [online], Retrieved from: <http://www.ntt-at.com/product/widebandspeech>, accessed: Sep. 9, 2004, [retrieved on: Mar. 4, 2017], 3 pages.
Baeckstroem, Tom et al., "Blind Recovery of Perceptual Models in Distributed Speech and Audio Coding," Interspeech 2016, Sep. 2016, 5 pages.
Baeckstroem, Tom, "Vandermonde Factorization of Toeplitz Matrices and Applications in Filtering and Warping," IEEE Transactions on Signal Processing, vol. 61, No. 24, Dec. 15, 2013, pp. 6257-6263.
Bosi, Marina et al., "Introduction to Digital Audio Coding and Standards," Dordrecht, The Netherlands: Kluwer Academic Publishers, 2003, 426 pages.
Bosi, Marina et al., "ISO/IEC MPEG-2 Advanced Audio Coding.," Journal of the Audio Engineering Society, vol. 45, No. 10, Oct. 1997, pp. 789-814.
Boufounos, Petros T. et al., "1-Bit Compressive Sensing," in Information Sciences and Systems, 2008. CISS 2008. 42nd Annual Conference on. IEEE, 2008, pp. 16-21.
Brandenburg, Karlheinz et al., "ISO/IEC MPEG-2 Advanced Audio Coding: Overview and Applications, presented at 103rd Convention 1997 Sep. 26-29, 1997 New York," AEC An Audio Engineering Society Preprint, Sep. 1997, 15 pages.
Dong, Hui et al., "Distributed Audio Coding in Wireless Sensor Networks," in Computational Intelligence and Security, 2006 International Conference on, vol. 2. IEEE, 2006, pp. 1695-1699.
Fastl, H. et al., "Psychoacoustics:Facts and Models," Springer, vol. 22, 2006.
Girod, Bernd et al., "Distributed Video Coding," Proceedings of the IEEE, vol. 93, No. 1, Jan. 2005, pp. 71-83.
Goyal, Vivek K., "Multiple Description Coding: Compression Meets the Network," IEEE Signal Processing Magazine, vol. 18, No. 5, 2001, pp. 74-93.
Kasem, M. H. et al., "Performance of Perceptual 1-Bit Compressed Sensing for Audio Compression," 20th IEEE Symposium on Computers and Communication (ISCC) XP032864197, Jul. 6, 2015, pp. 477-482.
Kubin, Gernot et al., "Multiple-Description Coding (MDC) of Speech With an Invertible Auditory Model," in Speech Coding, IEEE Workshop, 1999, pp. 81-83.
Majumdar, Abhik et al., "Distributed Coding for Wireless Audio Sensors," in IEEE Workshop on Applications of Signal Processing to Audio and Acoustics, 2003, IEEE Workshop, 2003, pp. 2019-212.
Prandi, Giorgio et al., "Detection and Identification of Sparse Audio Tampering Using Distributed Source Coding and Compressive Sensing Techniques," Proc. of the 11th Int. Conference on Digital Audio Effects (DAFx-08), Espoo, Finland, Sep. 1-4, 2008, Sep. 2008, pp. 1-4.
Smith III, Julius O. et al., "Bark and ERB Bilinear Transforms," IEEE Transactions on Speech and Audio Processing, vol. 7, No. 6, Nov. 1999, pp. 697-708.
Srikanth, Korse et al., "Entropy Coding of Spectral Envelopes for Speech and Audio Coding Using Distribution Quantization," in Proc. Interspeech, 2016, 5 pages.
Xiong, Z. et al., "Distributed Source Coding," Handbook on Array Processing and Sensor Networks, 2004, pp. 609-643.
Xiong, Zixiang et al., "Distributed Source Coding for Sensor Networks," IEEE Signal Processing Magazine, vol. 21 No. 5, 2004, pp. 80-94.
Zahedi, Adel et al., "Audio Coding in Wireless Acoustic Sensor Networks," Signal Processing, vol. 107, 2015, pp. 141-152.
Zahedi, Adel et al., "Coding and Enhancement in Wireless Acoustic Sensor Network," in Data Compression Conference (DCC), 2015. IEEE, 2015, pp. 293-302.
Zheng, Fang et al., "Comparison of Different Implementations of MFCC," Journal of Computer-Science and Technology, vol. 16, No. 6, Nov. 2001, pp. 582-859.

\* cited by examiner

ENCODING APPARATUS FOR PROCESSING AN INPUT SIGNAL AND DECODING APPARATUS FOR PROCESSING AN ENCODED SIGNAL

CROSS-REFERENCE TO RELATED APPLICATIONS

This application claims priority from European Application No. 16160369.1, which was filed on Mar. 15, 2016, and from European Application No. 16189893.7, which was filed on Sep. 21, 2016, which are both incorporated herein by reference in their entirety.

BACKGROUND OF THE INVENTION

The invention refers to an encoding apparatus for processing an input signal and to a decoding apparatus for processing an encoded signal. The invention also refers to corresponding methods and to a computer program.

A central part of speech and audio codecs are their perceptual models, which describe the relative perceptual importance of errors in different elements of the signal representation. In practice, the perceptual models consist of signal-dependent weighting factors which are used in quantization of each element. For optimal performance, it would be desirable to use the same perceptual model at the decoder. While the perceptual model is signal-dependent, however, it is not known in advance at the decoder, whereby audio codecs generally transmit this model explicitly, at the cost of increased bit-consumption.

The era of Internet of Things (IoT) is approaching, whereby the next generation of speech and audio coders should embrace it. The design goals of IoT-systems however fit poorly with the classic design of speech and audio coders, whereby a larger redesign of the coders is necessitated.

Primarily, whereas state-of-the-art speech and audio coder such as AMR-WB, EVS, USAC and AAC consist of intelligent and complex encoders and relatively simple decoders [1-4], since IoT should support distributed low-complexity sensor-nodes, encoders are advantageously to be simple.

Secondly, since sensor-nodes are encoding the same source signal, application of the same quantization at each sensor-node would represent over-coding and potentially a serious loss in efficiency. Especially, since the perceptual model should be more or less the same at every node, transmitting it from every node is almost pure over-coding.

Conventional speech and audio coding methods consist of three parts:
1. a perceptual model which specifies the relative impact of errors in different parameters of the codec,
2. a source model which describes the range and likelihood of different inputs and
3. an entropy coder which utilizes the source model to minimize perceptual distortion [5].

Further, the perceptual model can be applied in either of two ways:
1. Signal parameters can be weighted according to the perceptual model, such that all parameters can then be quantized with the same accuracy. The perceptual model are then transmitted to the decoder such that the weighting can be undone.
2. The perceptual model can alternatively be applied as an evaluation model, such that the synthesis output of different quantizations are compared, weighted by the perceptual model, in an analysis-by-synthesis iteration. Though here the perceptual model has not to be transmitted, this approach has the disadvantage that quantization cells shapes are not regularly shaped which reduces coding efficiency. More importantly, however, to find the optimal quantization, a computationally complex brute-force search of different quantizations has to be used.

Since the analysis-by-synthesis approach thus leads to a computationally complex encoder, it is not a viable alternative for IoT. Therefore, the decoder needs access to the perceptual model. However, as noted above, explicit transmission of the perceptual model (or equivalently, an envelope model of the signal spectrum), is not desirable because it lowers coding efficiency.

The object of the invention is to present a way to recover the perceptual model at the decoder from the transmitted signal without side-information concerning the perceptual model.

SUMMARY

According to an embodiment, an encoding apparatus for processing an input signal may have a perceptual weighter and a quantizer, wherein the perceptual weighter has a model provider and a model applicator, wherein the model provider is configured for providing a perceptual weighted model based on the input signal, wherein the model applicator is configured for providing a perceptually weighted spectrum by applying the perceptual weighted model to a spectrum based on the input signal, wherein the quantizer is configured to quantize the perceptually weighted spectrum and for providing a bitstream, wherein the quantizer has a random matrix applicator and a sign function calculator, wherein the random matrix applicator is configured for applying a random matrix to the perceptually weighted spectrum in order to provide a transformed spectrum, and wherein the sign function calculator is configured for calculating a sign function of components of the transformed spectrum in order to provide the bitstream.

According to another embodiment, a decoding apparatus for processing an encoded signal may have a de-quantizer and a perceptual de-weighter, wherein the de-quantizer is configured to de-quantize a bitstream comprised by the encoded signal and for providing a calculated perceptually weighted spectrum, wherein the de-quantizer is configured to de-quantize the bitstream by applying a pseudo-inverse of a random matrix to the bitstream, wherein the perceptual de-weighter has a spectrum approximator and a model approximator, wherein the spectrum approximator is configured for calculating an approximation of a spectrum based on the calculated perceptually weighted spectrum, and wherein the model approximator is configured for calculating an approximation of a perceptual weighted model with which the encoded signal is associated based on the approximation of the spectrum.

According to another embodiment, a method for processing an input signal may have the steps of: providing a perceptual weighting model based on the input signal, weighting a spectrum of the input signal by applying the perceptual weighting model to the spectrum of the input signal, and quantizing the weighted spectrum by calculating a sign function of random projections of the weighted spectrum.

According to still another embodiment, a method for processing an encoded signal may have the steps of: providing a quantized perceptual signal by applying a pseudo-inverse of a random matrix to the encoded signal, calculating an estimation of a spectrum based on the quantized perceptual signal, and calculating an approximation of a perceptual weighting model used for providing the encoded signal based on the approximation of the spectrum.

Another embodiment may have a non-transitory digital storage medium having stored thereon a computer program for performing a method for processing an input signal, having the steps of: providing a perceptual weighting model based on the input signal, weighting a spectrum of the input signal by applying the perceptual weighting model to the spectrum of the input signal, and quantizing the weighted spectrum by calculating a sign function of random projections of the weighted spectrum, when said computer program is run by a computer.

Another embodiment may have a non-transitory digital storage medium having stored thereon a computer program for performing a method for processing an encoded signal, having the steps of: providing a quantized perceptual signal by applying a pseudo-inverse of a random matrix to the encoded signal, calculating an estimation of a spectrum based on the quantized perceptual signal, and calculating an approximation of a perceptual weighting model used for providing the encoded signal based on the approximation of the spectrum, when said computer program is run by a computer.

The invention is especially useful in distributed sensor-networks and the Internet of things, where the added cost on bit-consumption from transmitting a perceptual model increases with the number of sensors.

The invention according to one embodiment might also be labelled as a blind recovery of perceptual models in distributed speech and audio coding.

The input signal here is a speech and/or an audio signal to be encoded by the encoding apparatus.

The object is achieved by an encoding apparatus for processing an input signal. The encoding apparatus advantageously provides an encoded signal.

The encoding apparatus comprises a perceptual weighter and a quantizer.

The perceptual weighter comprises a model provider and a model applicator. The model provider is configured for providing a perceptual weighted model based on the input signal. The model applicator is configured for providing a perceptually weighted spectrum by applying the perceptual weighted model to a spectrum based on the input signal.

The quantizer is configured to quantize the perceptually weighted spectrum and for providing a bitstream. The quantizer comprises a random matrix applicator and a sign function calculator. The random matrix applicator is configured for applying a random matrix to the perceptually weighted spectrum in order to provide a transformed spectrum. The sign function calculator is configured for calculating a sign (or: signum) function of components of the transformed vector in order to provide the bitstream.

The quantization comprises at least two steps: In a first step, the perceptually weighted spectrum is combined with a random matrix. Such a random matrix has the advantage that for each input signal a different matrix is used. This becomes useful when a plurality of sensors covers the same audio source and over-coding has to be avoided. The second step includes that the sign function is calculated of the components of the transformed vector.

In one embodiment, the model provider is configured for providing the perceptual weighted model based on a compression of the spectrum based on the input signal.

In the inventive encoding apparatus the perceptual weighting of the input signal is based in one embodiment on a compression of the input signal. In an embodiment, the perceptual weighting is based on the compression of the envelope of the magnitude spectrum of the input signal (an envelope is a continuous, usually smooth shape describing a characteristic of the signal, her of the magnitude spectrum). Based on the compression a perceptual weighted model is obtained which is finally used to perceptually weight the spectrum of the input signal.

The encoding apparatus provides in one embodiment a bitstream with side-information covering some aspects about the encoding process.

In an embodiment, information about the quantization is provided as side-information by the encoded signal output by the encoding apparatus as result of the encoding process.

In a further embodiment, the perceptual weighter comprises an envelope calculator. The envelope calculator is configured for providing an envelope of a magnitude spectrum based on the input signal.

In one embodiment, the model provider is configured for calculating a compression function describing the compression of the envelope. Further, the model provider is configured for calculating the perceptual weighted model based on the compression function. In this embodiment, the model provider compresses the envelope and calculates a function describing this compression. Based on this function, the perceptual weighted model is obtained. In this embodiment, a compression of an envelope of a spectrum based on the input signal is performed, i.e. the magnitude-range is reduced and, thus, smaller than before the compression. By compressing the envelope, the spectrum as such is also compressed, i.e. the magnitude-range of the spectrum is reduced.

In a different embodiment, the perceptual weighted model or the compression function is calculated directly from the input signal or the magnitude/power spectrum based on the input signal.

According to an embodiment, the model provider is configured for calculating a compression function describing a compression of the spectrum based on the input signal or describing a compression of an envelope of a magnitude spectrum based on the input signal. The compression reduces a magnitude-range of the spectrum based on the input signal or reduced the magnitude-range of the envelope. Further, the model provider is configured for calculating the perceptual weighted model based on the compression function.

In an embodiment, the compression function—for compressing e.g. the spectrum or the envelope—fulfils two criteria:

At first, the compression function is strictly increasing. This implies that for any positive scalar value and an arbitrarily small value the function value for the positive scalar value is smaller than the function value for the sum of the positive scalar value and of the arbitrarily small value.

At second, for a first positive scalar value and a second positive scalar value greater than the first positive scalar value, a difference between the function value for the second positive scalar value and the function value for the first positive scalar value is smaller than a difference between the second positive scalar value and the first positive scalar value.

The object is also achieved by a method for processing an input signal. This input signal is advantageously an audio signal and/or a speech signal.

The method for processing an input signal—being an audio and/or speech signal—comprises at least the following steps:

calculating a perceptual weighted model based on the input signal, providing a perceptually weighted spectrum by applying the perceptual weighted model to a spectrum based on the input signal, and quantizing the perceptually weighted spectrum in order to provide a bitstream, wherein quantizing the perceptually weighted spectrum comprises:

applying a random matrix to the perceptually weighted spectrum in order to provide a transformed spectrum, and calculating a sign function of components of the transformed spectrum in order to provide the bitstream.

In an embodiment, the following steps are performed:

calculating an envelope of a magnitude spectrum based on the input signal, calculating the perceptual weighted model based on a compression of the envelope.

The embodiments of the encoding apparatus can also be performed by steps of the method and corresponding embodiments of the method. Therefore, the explanations given for the embodiments of the apparatus also hold for the method.

The object is further achieved by a method for processing an input signal, comprising:

providing a perceptual weighting model based on the input signal, weighting a spectrum of the input signal by applying the perceptual weighting model to the spectrum of the input signal, and quantizing the weighted spectrum by calculating a sign function of random projections of the weighted spectrum.

The method further comprises in an embodiment:

obtaining the random projections of the weighted spectrum by applying a random matrix to the weighted spectrum.

In an embodiment, providing the perceptual weighting model comprises compressing an envelope of a magnitude spectrum of the input signal.

According to an embodiment, the method further comprises:

obtaining the envelope by using a filterbank and a diagonal matrix containing normalization factors for each band.

The object is also achieved by a decoding apparatus for processing an encoded signal.

The decoding apparatus comprises at least a de-quantizer and a perceptual de-weighter.

The de-quantizer is configured to de-quantize a bitstream comprised by the encoded signal and for providing a calculated perceptually weighted spectrum. Further, the de-quantizer is configured to de-quantize the bitstream by applying a pseudo-inverse of a random matrix to the bitstream. The de-quantizer reverses effects of a quantization happened during the encoding process. The de-quantizer is followed by the perceptual de-weighter such that the spectrum resulting from the de-quantization is perceptually de-weighted. The calculated perceptually weighted spectrum is received by the perceptual de-weighter in order to be perceptually de-weighted. The finally obtained spectrum is, thus, a perceptually de-weighted de-quantized bitstream comprised by the input signal.

The perceptual de-weighter reverses the effects of a perceptual weighting that happened during the encoding process leading to the encoded signal. This is done in one embodiment without side-information of the encoded signal comprising the perceptual weighted model. The model is reconstructed from the encoded audio signal as such.

The perceptual de-weighter comprises a spectrum approximator and a model approximator.

The reconstruction of the model is done in one embodiment in an iterative way for which starting or initial values are necessitated. Hence, an initial guess provider comprised by the perceptual de-weighter is configured for providing data for an initial guess of a perceptual weighted model with which the encoded signal is associated. The data for the initial guess comprises in one embodiment a vector with the diagonal elements of a matrix describing the perceptual weighted model.

The spectrum approximator is configured for calculating an approximation of a spectrum based on the calculated perceptually weighted spectrum. Further, the model approximator is configured for calculating an approximation of a perceptual weighted model with which the encoded signal is associated (i.e. which was used for encoding of the input signal and, thus, generating the encoded signal) based on the approximation of a spectrum.

In an embodiment, the perceptual de-weighter comprises an initial guess provider. The initial guess provider is configured for providing data for an initial guess of the perceptual weighted mode. The spectrum approximator is configured for calculating the approximation of the spectrum based on the encoded signal and the initial guess or the approximation of the perceptual weighted model. Further, the approximation of a spectrum is based in an embodiment either on the initial guess or on an—especially calculated—approximation of the perceptual weighted model. This choice depends on the fact whether the iteration just has started—with the initial guess—or at least one iteration with at least one improvement of the approximation—leading to the approximation of the perceptual weighted model—has happened already. The iteration is performed in one embodiment until a convergence criterion has been fulfilled.

The de-quantizer is configured in one embodiment to de-quantize the bitstream comprised by the encoded signal based on side-information about the random matrix comprised by the encoded signal. This embodiment refers to the encoding process in which a quantization is performed using a random matrix. The information about the used random matrix is comprised by the side-information of the encoded signal. The side-information comprises in one embodiment just the seed of the columns of the random matrix.

In one embodiment, a plurality of encoded signals is processed jointly. Each encoded signal comprises a bitstream with side-information concerning at least information about the quantization performed while providing the respective encoded signal. For this purpose, the de-quantizer is configured to receive a plurality of input signals and to provide a and in one embodiment just one calculated perceptually weighted spectrum based on the plurality of input signals. The input signals advantageously refer to the audio/speech signal stemming from the same signal source.

In another embodiment, the decoding apparatus is configured to apply source modelling. A source model describes the range and likelihood of different inputs.

The object is also achieved by a method for processing an encoded signal. This encoded signal is advantageously an encoded audio signal and/or an encoded speech signal.

The method for processing (or decoding) an encoded signal comprises at least the following steps:

de-quantizing a bitstream comprised by the encoded signal and providing a calculated perceptually weighted spectrum, wherein de-quantizing the bitstream comprises applying a pseudo-inverse of a random matrix to the bitstream, calculating an approximation of a spectrum based on the calculated perceptually weighted spectrum, and calculating an approximation of a perceptual weighted model with which the encoded signal is associated (i.e. which was used for generating the encoded signal) based on the approximation of a the spectrum.

In one embodiment, the method comprises the steps:

calculating an approximation of the spectrum either based on the calculated perceptually weighted spectrum and an initial guess or based on the calculated perceptually weighted spectrum and an approximation of the perceptual weighted model with which the encoded signal is associated.

The calculated approximations of the perceptual weighted model may be used for the next calculation of the approximation of a spectrum.

The object is also achieved by a method for processing an encoded signal, comprising:

providing a quantized perceptual signal by applying a pseudo-inverse of a random matrix to the encoded signal, calculating an estimation of a spectrum based on the quantized perceptual signal, and calculating an approximation of a perceptual weighting model used for providing the encoded signal based on the approximation of the spectrum.

According to an embodiment, the method further comprises:

providing a zero-th approximation of the perceptual weighting model using an initial guess, and calculating a zero-th estimation of the spectrum based on the zero-th approximation of the perceptual weighting model.

In a further embodiment, the method further comprises:

obtaining the initial guess by using a filterbank and a diagonal matrix containing normalization factors for each band.on The embodiments of the apparatus can also be performed by steps of the method and corresponding embodiments of the method. Therefore, the explanations given for the embodiments of the apparatus also hold for the method.

The object is also achieved by a system comprising at least one encoding apparatus and a decoding apparatus. In one embodiment, a plurality of encoding apparatuses are used which in one embodiment are associated with sensor-nodes, e.g. microphones.

The object is also achieved by a computer program for performing, when running on a computer or a processor, the method of any of the preceding embodiments.

BRIEF DESCRIPTION OF THE DRAWINGS

Embodiments of the present invention will be explained in the following referring to the accompanying drawings, in which.

DETAILED DESCRIPTION OF THE INVENTION

Figure 1:
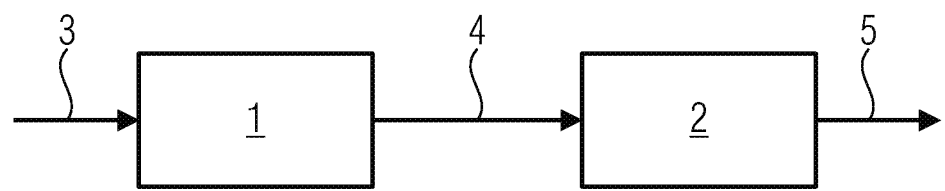
FIG. 1 shows a block diagram of a first embodiment system comprising an encoding apparatus and a decoding apparatus.

FIG. 1 shows a system for handling an input signal 3 which is a speech and/or audio signal. This input signal 3 is encoded by an encoding apparatus 1. The encoded signal 4 being advantageously a bit stream is, for example, transmitted via the Internet to a decoding apparatus 2 which decodes the encoded signal 4 and provides an extracted audio signal 5 to a—not shown—listener.

The encoding apparatus 1 uses a perceptual weighted model for processing the input signal 3 but this model is not transmitted by the encoded signal 4. The decoding apparatus 2 extracts the model from the encoded signal 4 in order to undo the effects of the model.

Figure 2:
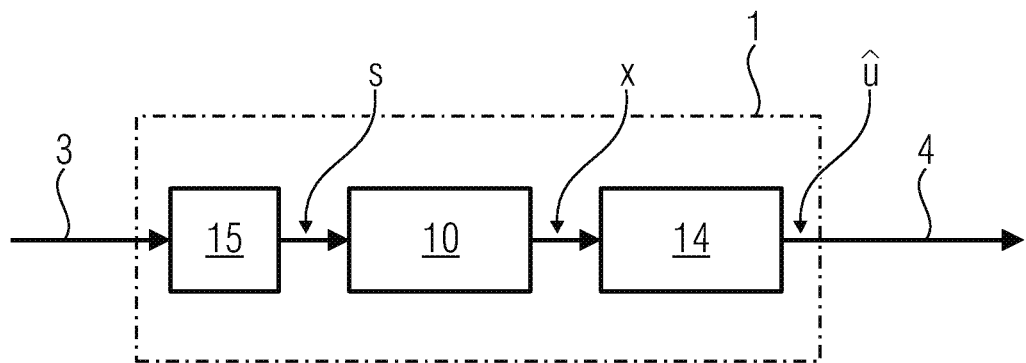
FIG. 2 shows a block diagram of an embodiment of an encoding apparatus.

The encoding apparatus 1 shown in FIG. 2 comprises a transformer 15, a perceptual weighter 10, and a quantizer 14.

The transformer 15 provides a spectrum s based on the input signal 3 being a time signal. This is done, for example, by short-time Fourier transform (STFT).

The spectrum s undergoes a perceptual weighting by the perceptual weighter 10 becoming a perceptually weighted spectrum x. This spectrum x is submitted to the quantizer 14 which quantizes it and provides a quantized signal û being a bitstream. That quantized signal û is in this embodiment combined with corresponding side-information covering information about the quantization—but in this embodiment not about the perceptual weighted model—to provide the encoded signal 4.

Figure 3:
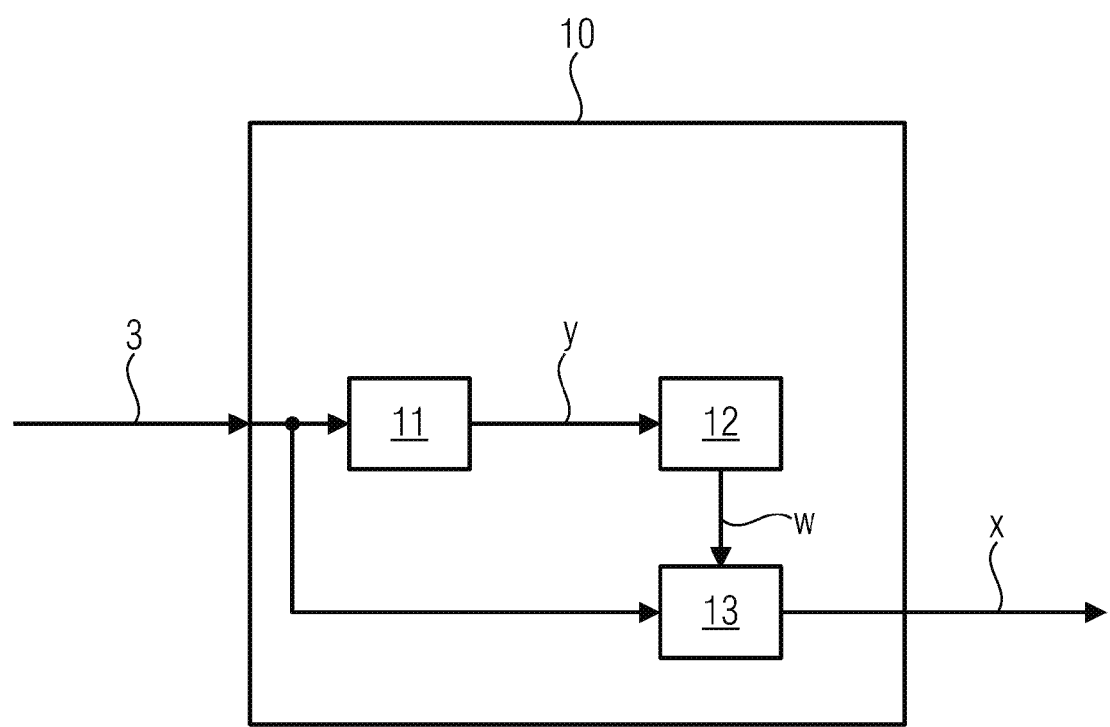
FIG. 3 shows a block diagram of a perceptual weighter as a part of an encoding apparatus.

FIG. 3 shows an embodiment of the perceptual weighter 10.

The perceptual weighter 10 receives the input signal 3—or a corresponding spectrum after a transformation of the input signal 3 to the frequency domain—and provides a perceptually weighted spectrum x. For this purpose, the perceptual weighter 10 comprises an envelope calculator 11, a model provider 12, and a model applicator 13.

The envelope calculator 11 receives the input signal 3 or a corresponding spectrum and provides an envelope y of a magnitude spectrum |x| based on the input signal 3. In the shown embodiment, the envelope calculator 11 provides the envelope y by a matrix A and a diagonal matrix Λ. The matrix A is a filterbank and the diagonal matrix Λ contains normalization factors for each band of the used filterbank. The envelope y is then obtained based on the magnitude spectrum |x| of the input signal 3 by the equation $y = A \Lambda A^T |x|$, whereas $A^T$ is the transposed of the matrix A.

Based on this envelope y, the model provider 12 compresses the envelope y. The purpose of the compression is to obtain a function which approximates perceptual performance of the ear. In the following, an embodiment is discussed in which the envelope is compressed by raising y to the power of p. When, for example, p equals 0.3, then the range of $y^p$ will be smaller then the range of the original y. The amount of compression, in this example, thus depends on the value p. For example, the envelope is reduced to a desired range. In one embodiment, a range-reduction or a compression function for compressing the envelop y is given by $y^p$ with $0<p<1$. This means that the compression is performed by an exponentiational function of the envelope with an exponent greater zero and smaller one. This compression is performed in one embodiment sample-wise.

The compression function $f(y)$ describes a vector w, i.e. $w=f(y)$ that gives diagonal elements of a perceptual weighted model W. Here, the input y is given as a vector and function f is applied on all samples of the vector y, resulting in a vector w. So if the k'th sample of y is $y_k$, then the k'th sample of $w=f(y)$ is $w_k=f(y_k)$.

Hence, based on the compression function, the perceptual weighted model W can be obtained, here in the form of a matrix.

With other words: The envelope of the magnitude spectrum is compressed and from the function describing the compressed envelope, the perceptual weighted model is calculated which is used to perceptually weight the spectrum.

The model applicator 13 applies the perceptual weighted model W to the spectrum s based on the input signal 3. In the shown embodiment, the model applicator 13 applies the matrix of the perceptual weighted model W to a vector based on the spectrum.

The perceptual modelling will now be explained once more:

Speech and audio codecs are based on efficient modelling of human auditory perception. The objective is to obtain such a weighting of quantization errors that optimization of the signal-to-noise ratio in the weighted domain gives the perceptually best possible quality.

Audio codecs operate generally in the spectral domain, where the spectrum of an input frame s can be perceptually weighted with a diagonal matrix W such that the weighted spectrum $x=Ws$ can be quantized $\hat{x}=\lfloor Ws \rceil$, where the brackets $\lfloor \ \rceil$ denotes quantization.

At the decoder, the inverse operation $\hat{s}=W^{-1}\hat{x}$ can be reconstructed.

Specifically, the perceptual weighting model consists of two parts:
i) A fixed part corresponding to the limits of perception at different frequency bands. Perceptual models such as Bark- and ERB-scales model the density of frequencies such that the warped axis has uniform perceptual accuracy [17]. However, since an objective is to measure error energy on the warped scale, the magnitude of spectral components can equivalently be scaled such that the computationally complex warping operation can be avoided [18]. This operation is also similar to the pre-emphasis operation applied in speech codecs [1-3]. Since this part of the weighting is fixed, it does not need to be explicitly transmitted. It can be applied at the encoder and directly reversed at the decoder.
ii) The signal-adaptive part of the perceptual model corresponds to the frequency-masking properties of perception. Namely, high-energy components of the signal will mask lower energy components and thus render them inaudible, if the two are sufficiently close in frequency [5]. The shape of the frequency-masking curve is thus equal to the shape of the signal envelope, but with a smaller magnitude.

Figure 4:
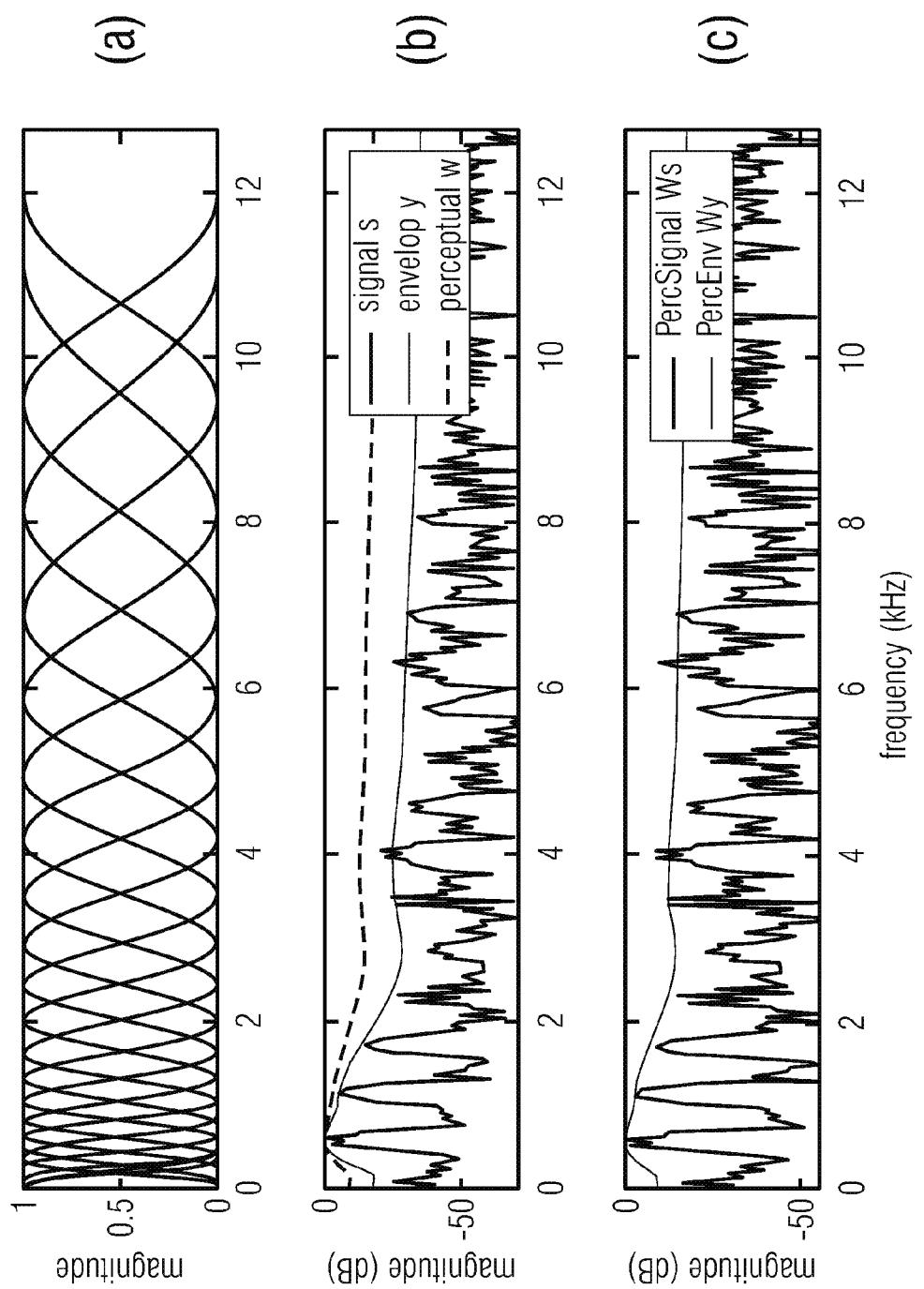
FIG. 4 shows signals belonging to an encoding process.

If $|x|$ is the magnitude spectrum of the input signal, its spectral envelope y can be obtained in an embodiment by $y=A\Lambda A^T|x|$, where matrix A is a filterbank such as in FIG. 4(a).

In difference to the common MFCC-type filterbanks [19], an asymmetric Hann-window type windows is used in one embodiment with an overlap extending from the kth filter to the (k−2) and (k+2) filters (see FIG. 4(a)).

The diagonal matrix Λ contains normalization factors for each band such that unit-gain is obtained.

Depending on the embodiment, a Mel-, Bark- or ERB-scale is used with a suitable number of bands.

At a sampling rate of 12.8 kHz, here a Mel-filterbank with 20 bands was used.

An alternative to the MFCC-type filterbank matrix is to use spreading by filtering, whereby A becomes a convolution matrix. Since filtering operations are well-understood digital signal processing methods, their inverses are readily found as well.

The perceptual weighting factors model the frequency masking effect, which in turn corresponds to spreading and scaling of energy over frequencies [20, 5]. The envelope model matrix A already achieves the effect of spreading, whereby still the scaling of energy has to be modelled.

The energy scaling corresponds to compression of the signal, which reduces the magnitude-range of the envelope (see FIG. 4(b)). Hence, if the spectrum s is multiplied with the perceptual weighting matrix W, a spectrum $x=Ws$ is obtained which has a reduced range (see FIG. 4(c)).

Perceptual weighting, thus, reduces the range or flattens the spectrum, but it does not produce a spectrum with an entirely flat envelope. The range of the envelope is reduced, whereby a part of its range is retained, and that remaining range can be used to recover the original signal following the expanded envelope.

The range-reduction or compression function $w=f(y)$ for the envelope y (where vector w gives the diagonal elements of W), can be applied for example as a sample-wise exponent $f(y)=y^p$ with $0<p<1$.

Given a spectrum s and its k'th sample $s_k$, weighting is applied by multiplication such that $x_k=w_k*s_k$, where $x_k$ is the k'th sample of the weighted spectrum x and $w_k$ is the k'th sample of the weighting vector w. The same operation can be expressed as a matrix operation by generating a matrix W, which has the weighting values on the diagonal $W_{kk}=w_k$, and the matrix is zero at all other positions. It follows that $x=W*s$.

While it is possible to use any function which compresses the range of y, exponentiation has the benefit that it leads to simple analytic expression in envelope reconstruction at the decoder.

Suitable compression functions f( ) fulfil the following requirements:
1. the compression functions are strictly increasing, i.e. $f(t)<f(t+eps)$, where t is any positive scalar value and eps is an arbitrarily small value,
2. for any positive scalar values (first and second scalar value, t1, t2) t1<t2, it holds $f(t2)-f(t1)<t2-t1$. In other words, any function which reduces the distance between such two positive scalar values t2−t1 is a suitable function.

In addition to exponentiation $f(y)=y^p$, with a small exponent p, in a different embodiment, the compression function is the logarithm, that is, $f(y)=\log(y)$.

The encoder algorithm as an encoding method or realized by the encoding apparatus is then in one embodiment:
1. Calculate the envelope of the magnitude spectrum.
2. Compress the envelope to obtain the perceptual weighting model.
3. Apply weighting on spectrum $x=Ws$.
4. Quantize and transmit weighted spectrum sign(Px).

This algorithm is applied independently at every sensor-node.

The perceptual weighting is followed by a quantization. The invention, thus, consists of two parts:
1. distributed quantization of the input signal using random projections and 1 bit quantization, and
2. implicit transmission of the perceptual model.

By quantization of random projections, each transmitted bit encodes a unique piece of information and over-coding is avoided.

The perceptual model is generated independently at each sensor-node (e.g. comprising a microphone) and the quantized perceptually weighted signal is transmitted. Perceptual weighting makes the signal more flat, but the basic shape is retained. Therefore, it can be inversely deduced at the decoder side what the original envelope has been, even from the perceptually weighted signal.

It follows a discussion of the distributed quantization:

Though distributed source coding is a well-studied subject (e.g. [7, 8]) and it has been applied in other applications such as video [9], only a few have worked on distributed audio coding (e.g. [10-13]), and none of them however addresses the over-coding problem with respect to perceptual and envelope models. Even the scalable coding approach in [14] includes envelope coding with scale factors. Also the multiple description coding approach has been applied only to packet loss concealment [15, 16].

It follows an easily implementable quantization scheme. Compare the 1 bit quantization method which has been used in compressive sensing systems [6].

The objective of the quantizer and the quantization process is to allow quantization at independent sensors, such that it is ensured that each transmitted bit improves quality, without communication between sensor-nodes. In the extreme, a sensor could send only one bit and that single bit could be used to improve quality.

The proposed quantization scheme of one embodiment is based on random projections of a real-valued representation of the signal spectrum and transmitting the sign of each dimension.

Let x be the real-valued N times 1 vector containing the spectrum of the input signal, and P a K times N random matrix whose columns are normalized to unit length. Then, x will be transformed by u=Px. This is followed by a quantization of the sign of each component of u, that is, the quantization is û=sign(u), which can be transmitted losslessly with K bits.

The number of bits of the bitstream, thus, defines one dimension of the random matrix.

The samples of P may be pseudo-random values, which means that they look like random values, but are actually generated by some complex mathematical formula or algorithm. Pseudo-random generators are standard mathematical tools which every computer and every mathematical software-library has. Relevant are: that the matrix P has to be known at both the encoder and receiver/decoder, and that the distribution of the random numbers is the same for all samples in P.

The reconstruction as an approximation of x can readily calculated by $$\hat{x} = P^\dagger \hat{u} = P^\dagger \text{sign}(Px) \quad (1)$$

where $p^\dagger$ is the pseudo-inverse of the random matrix P.

As long as the seed for the pseudo-random columns of P is known at the decoder, the decoder can thus decode the signal from û only. Hence, in one embodiment, the seed of the pseudo-random columns are given as side-information of the encoded signal. Pseudo-random generators usually generate sequences of random values such that given the previous value x(k) in the sequence, it generates the next random sample, x(k+1)=f(x(k)). That is, if the starting point x(1)—called the "seed" value of the pseudo-random sequence—is known, then it is possible to generate the whole sequence. Hence, at the encoding and decoding side the same function for generating the random samples is used.

In the case of multiple sensor-nodes, the input signal x is assumed to be the same or noisy versions of the same signal, but each sensor has its own random matrix $P_k$. At the decoder the random matrices can be collated to a single large matrix $P=[P_1, P_2, \ldots]$ whereby Eq. 1 remains unchanged.

It is well-known that if K<<N, then P is approximately orthonormal, $P^T P \approx I$ and the quantization is near-optimal.

Here, K is not necessarily smaller than N, whereby the orthonormality becomes less accurate. Using the transpose instead of the pseudo-inverse decreases algorithmic complexity and coding efficiency, but does not impose a limitation to our experiments on perceptual modelling, since every transmitted bit still improves the accuracy of the output signal.

It can be expected that a source model would then be applied on the decoder side and that such a model would increase the accuracy of the reconstruction. It is however not necessary to implement a source model, since its effect can be simulated by increasing the accuracy by sending more bits.

Figure 5:
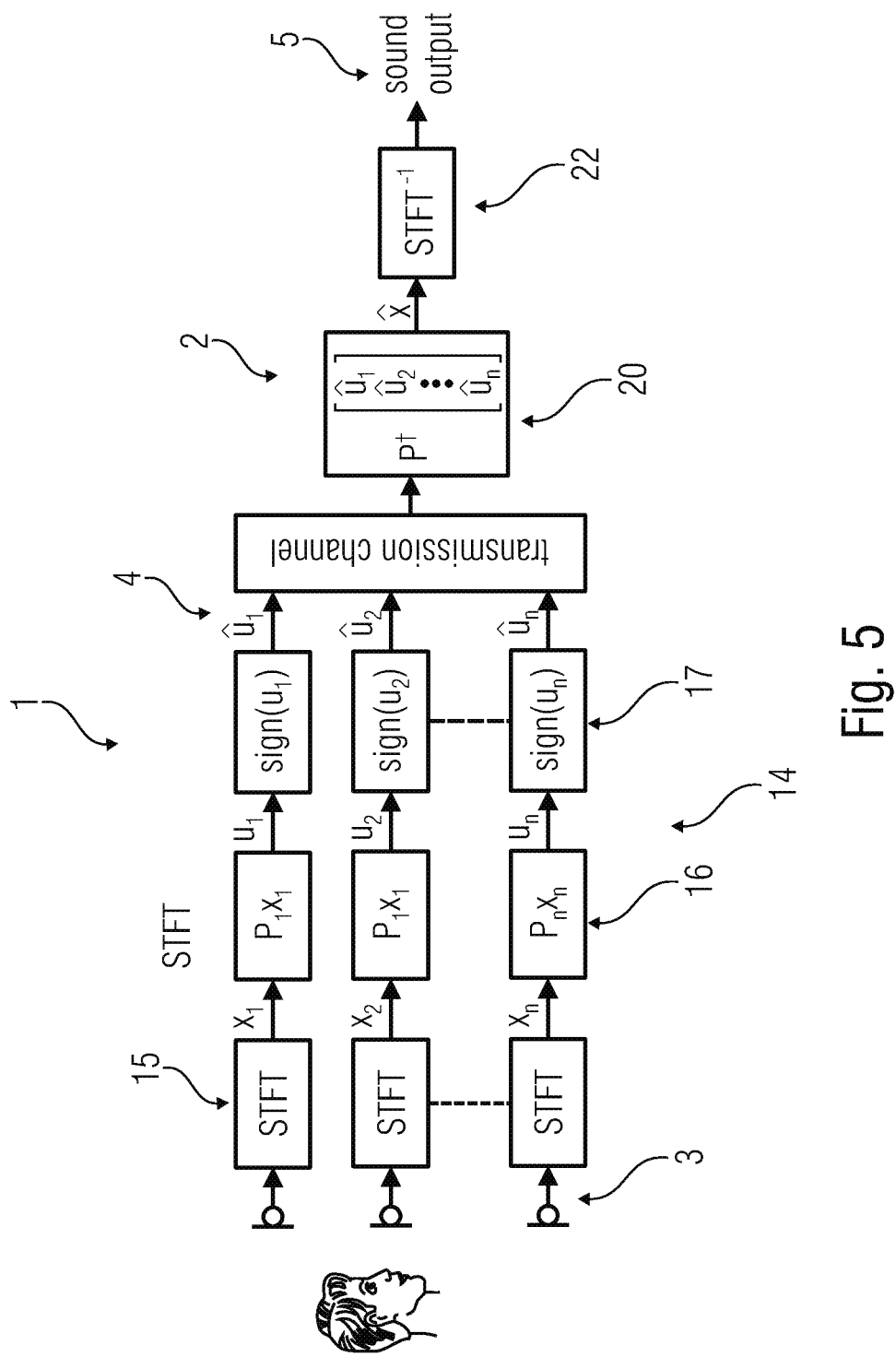
FIG. 5 shows a block diagram of a second embodiment of a system comprising a multitude of encoding apparatuses.

The flow-diagram of an embodiment of the system (excluding the perceptual model) is illustrated in FIG. 5. Shown are n microphones capturing the audio signals from one audio source. The following encoder apparatuses 1 are in the shown embodiment part of the respective microphone- or sensor-node.

The n input signals 3 are transformed by the transformers 15 of the n encoding apparatuses 1 into n spectra s which are converted into n perceptually weighted spectra $x_k = W_k s_k$ which is done here by the not shown perceptual weighters.

The n perceptually weighted spectra $x_k$ are submitted to the n quantizer 14.

Each quantizer 14 comprises a random matrix applicator 16 and a sign function calculator 17.

The random matrix applicators 16 apply a random matrix $P_i$ being a matrix with dimensions K times N to a N times 1 vector based on the respective perceptually weighted spectrum $x_i$ with i=1, 2, . . . , n. N is an integer scalar corresponding to the number of samples in the spectrum x. K is an integer scalar corresponding to the number of rows in the randomized spectrum. By a quantization with the sign-operator, each row is quantized with one bit, whereby the number of bits transmitted is K. When multiple encoders—e.g. microphones—are used, then each encoder has its own matrix $P_k$, which are of size $K_k \times N$. That is, each encoder sends $K_k$ bits to the decoder, where the number of bits can vary from encoder to encoder.

The transformed spectra are given by: $u_i = P_i x_i$.

The sign function calculator 17 calculates the sign or sign function of the respective transformed spectrum: $\hat{u}_i = \text{sign}(u_i)$. This is done to the K components of the transformed spectra leading to K bits being transmitted via a transmission channel.

Figure 6:
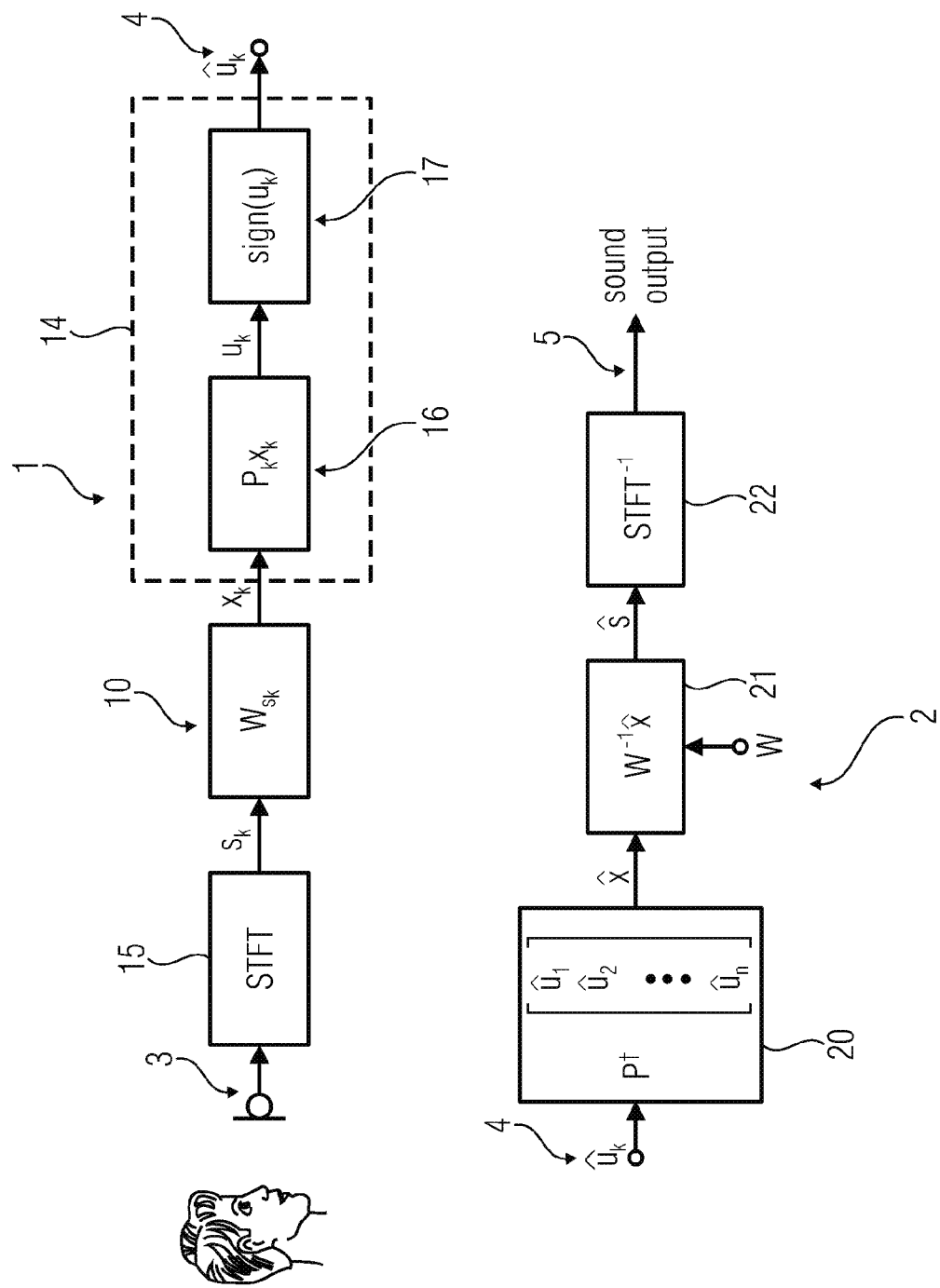
FIG. 6 shows a more detailed block diagram of a third embodiment of a system.

FIG. 6 shows one encoding apparatus 1 comprising the perceptual weighter 10 and the quantizer 14.

The audio signal 3 is transformed by a transformer 15 into a spectrum $s_k$. The perceptual weighter 10 applies the perceptual weighting matrix W to the spectrum $s_k$ in order to provide the perceptually weighted spectrum $x_k$ which is quantized by the quantizer 14.

The quantizer 14 comprises the random matrix applicators 16 which receives the perceptually weighted spectrum $x_k$ and applies the random matrix $P_k$ to it via $P_k x_k$. The components of the resulting transformed spectrum $u_k$ are quantized by the sign function calculator 17 via calculating the sign function of each component. This leads to a bitstreams with number of bits equaling the number of components of the transformed spectrum. The encoded signal 4 is, thus, given by the bitstream $\hat{u}_k$.

It follows a discussion of the way to decode the encoded signals.

Figure 7:
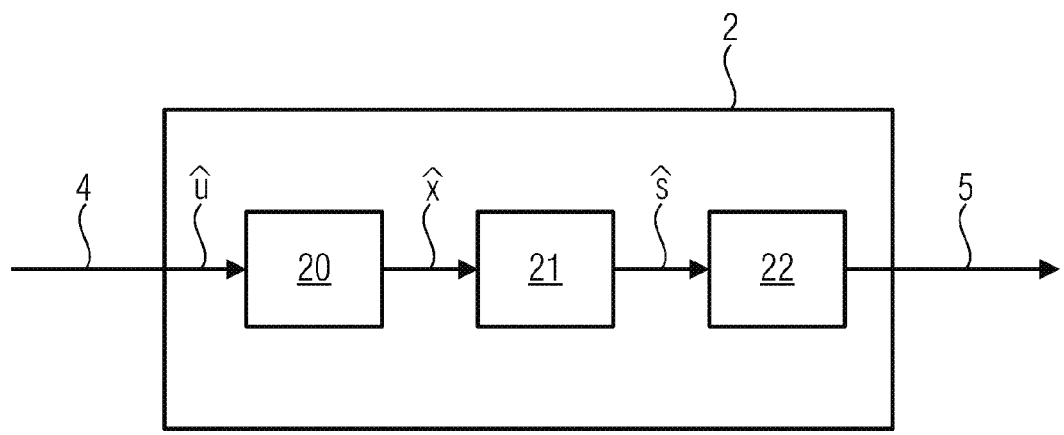
FIG. 7 shows a block diagram of an embodiment of a decoding apparatus.

FIG. 7 shows an embodiment of a decoding apparatus 2 for processing an encoded signal 4.

The encoded signal 4 is in form of the bitstream $\hat{u}$ de-quantized by a de-quantizer 20.

The encoded signal 4 is de-quantized by using the pseudo-inverse $P^\dagger$ of the random matrix P. The information about the random matrix is taken from the side-information of the encoded signal 4. The calculated perceptually weighted spectrum is given by: $\hat{x} = P^\dagger \hat{u}$.

The calculated perceptually weighted spectrum $\hat{x}$ is de-weighted by the perceptual de-weighter 21. The calculated spectrum $\hat{s}$ provided by the perceptual de-weighter 21 is transformed by a de-transformer 22 (e.g. via the inverse short-time Fourier transform, $STFT^{-1}$) into a time signal which is the extracted audio signal 5.

Figure 8:
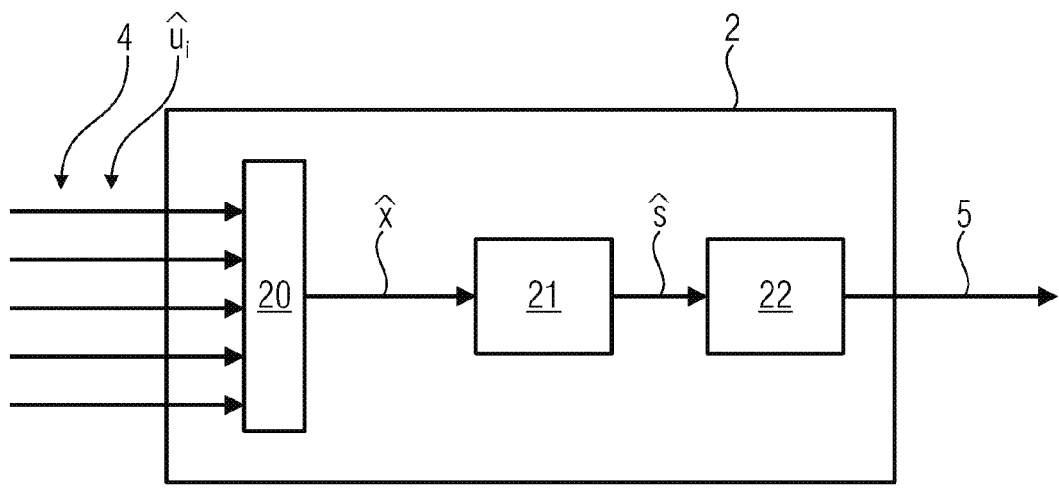
FIG. 8 shows a block diagram of a different embodiment of a decoding apparatus.

FIG. 8 shows an embodiment in which the de-quantizer 20 receives a plurality of encoded signals 4 from different sensor-nodes, i.e. from different microphones. The individual random matrices $P_k$ are collated into a single large matrix $P=[P_1, P_2, \ldots ]$.

The single calculated perceptually weighted spectrum is then given by:

$$\hat{x} = \begin{bmatrix} P_1 \\ P_2 \\ \ldots \\ P_n \end{bmatrix}^\dagger \begin{bmatrix} u_1 \\ u_2 \\ \ldots \\ u_n \end{bmatrix}.$$

In an alternative embodiment, the bit-streams are inverted with their respective random matrix $\hat{x}_k = P_k^\dagger u_k$ and the spectra are merged afterwards.

The obtained calculated perceptually weighted spectrum $\hat{x}$ is treated as described for the embodiment shown in FIG. 7.

Figure 9:
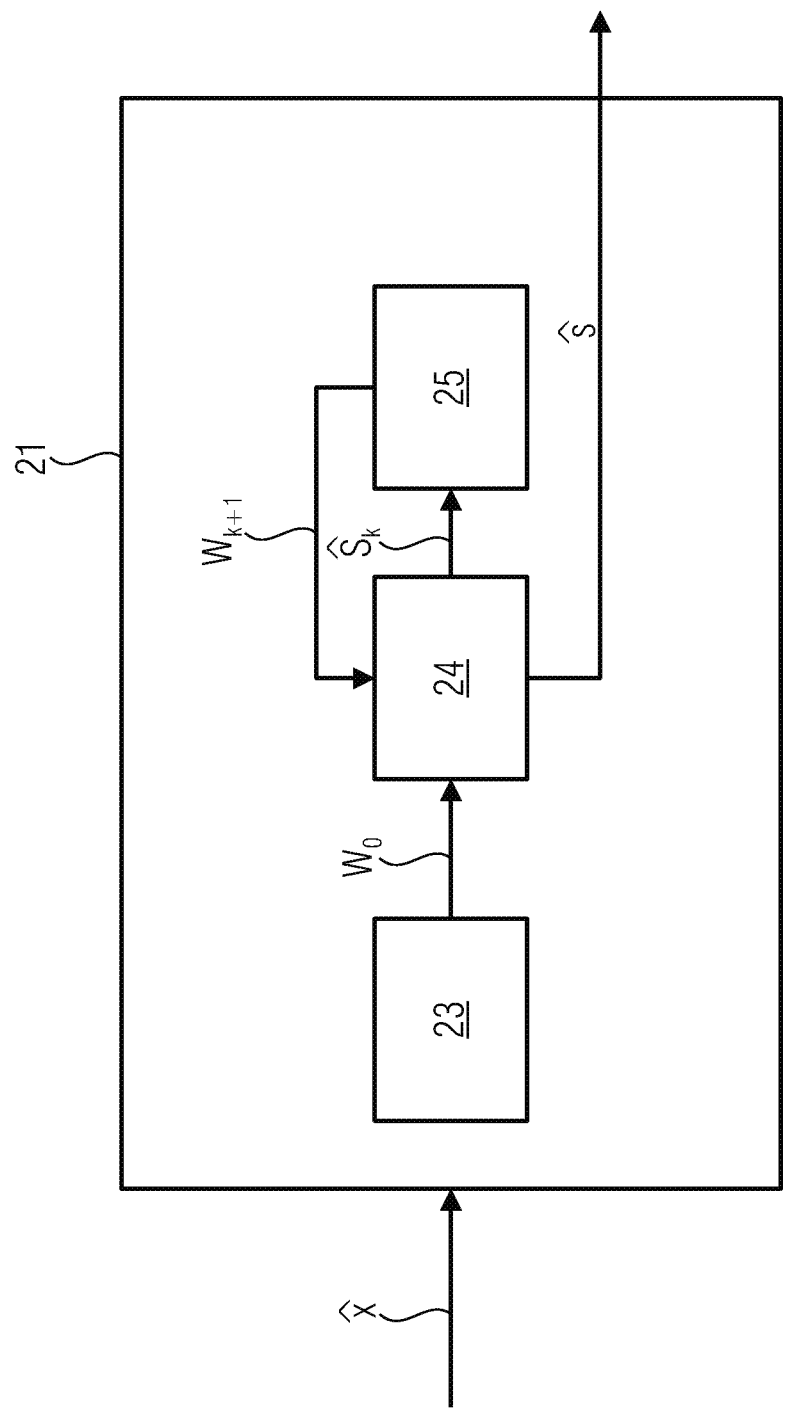
FIG. 9 shows an embodiment of a perceptual de-weighter as part of a decoding apparatus.

In FIG. 9 an embodiment of the perceptual de-weighter 21 as part of a decoding apparatus is shown.

The perceptual de-weighter 21 receives from the de-quantizer 20 the calculated perceptually weighted spectrum $\hat{x}$ which is the de-quantized bitstream of the encoded signal 4.

The perceptual de-weighter 21 recovers the perceptual weighted model W used during the encoding of the input signal 3 by using an iterative algorithm. Here, $W_k$ is the k-th approximation or guess of the perceptual weighted model W.

The algorithm starts with an initial guess provider 23. The initial guess provider 23 provides a zeroth estimation $W_0$ of the perceptual weighted model W.

In the shown embodiment, the vector $w_k$ is used which comprises the diagonal elements of the respective matrix $W_k$. Such a vector was used with the compression function of the envelope of the magnitude spectrum during the perceptual weighting of the input signal.

Hence, a 0-th guess of the vector $w_0$ is given and the 0-th approximation $W_0$ of the perceptual weighted model W is appropriately set.

The initial guess of the approximation vector $w_0$ is set in one embodiment by using the equation used for the calculation of the envelope y of the magnitude spectrum.

So, the initial guess becomes: $w_0 = A \Lambda A^T \hat{x}$ with the matrix A and a diagonal matrix $\Lambda$.

The matrix A is a filterbank and the diagonal matrix $\Lambda$ contains normalization factors for each band of the used filterbank. The choice of matrix A is a design choice, which would typically be fixed in advance. In an embodiment, in which matrix A does not change over time, it is hardwired into both the encoder and decoder. This implies that both encoder and decoder use the same known matrix A. In a different embodiment, the matrix A used for the encoding is transmitted as part of the encoded signal. In one embodiment, the choice regarding the matrix A is transmitted in an initialization or configuration step, before the actual communication starts. The foregoing also refers to the diagonal matrix $\Lambda$.

The initial guess matrix $W_0$ is given to a spectrum approximator 24. This also starts the actual iteration with a running index k set to 0.

The spectrum approximator 24 calculates based on the data $w_0$ for the initial guess $W_0$ of the perceptual weighted model W an approximation of the spectrum.

This is done via applying the inverse of the initial guess matrix $W_0$ to a vector containing the calculated perceptually weighted spectrum $\hat{x}$.

The spectrum is approximated in this step with k=0 by $\hat{s}_0 = W_0^{-1} \hat{x}$.

The approximated spectrum $\hat{s}_0$ is provided to a model approximator 25 that calculates a new approximation $W_1$ for the perceptual weighted model W.

This is based on the knowledge that the vector of the diagonal elements $w_k$ is a function of the spectrum $\hat{s}_k$.

In one embodiment, the compression function f( ), which is used during the encoding to generate the matrix W, is known at the decoding side. Like discussed before concerning the matrix A, the compression function f( ) is either set at both sides, e.g. fixed in the respective software for encoding and decoding or is transmitted as part of the encoded signal.

Hence, the next approximation of the vector is calculated via: $w_1 = f(\hat{s}_0)$ and the next—here first—approximation $W_1$ is obtained.

This approximation $W_1$ is returned to the spectrum approximator 24 for calculating the next approximated spectrum $\hat{s}_k = W_k^{-1} \hat{x}$. The index k is increased accordingly.

This approximation serves afterwards for obtaining the next approximation $W_{k+1}$ of the perceptual weighted model W based on the vector with diagonal elements given by the equation: $w_{k+1} = f(\hat{s}_k)$.

This is repeated until converged. Convergence is usually checked by comparing the current output vector w(k) with the previous vector w(k−1). If the difference $\|w(k)-w(k-1)\|$ is below some preset threshold, then the iteration has converged and iterations can be stopped.

The finally obtained approximated spectrums $\hat{s}$ is the output of the perceptual de-weighter 21 and is the approximation of the spectrum of the original input signal.

The reconstruction of the Perceptual Model is explained once more:

At the decoder side, an estimate $\hat{x}$ of the perceptual signal x (see Eq. 1) can be recovered by $\hat{x} = P^\dagger \text{sign}(Px)$ where $\hat{u}$=sign(Px) is the quantized perceptually weighted spectrum x. This is done by the de-quantizer 20.

The main task is thus to recover an estimate $\hat{s}$ of the original signal s from the quantized perceptual signal $\hat{x}$.

The perceptually weighted spectrum x is based on the spectrum of the input signal via the perceptual weighted model W by the equation: x=Ws.

The aim is that the estimate equals the spectrum, i.e. $\hat{x} \approx x$. Hence, Ws≈W$\hat{s}$.

Furthermore, the vector w giving the diagonal elements of the matrix W are a function of the spectrum s of the input signal: w=f(s).

Therefore, with an estimate of w, $\hat{s}$ can be estimated, whereby w can be estimated. This can be iterated until convergence.

This is thus an Expectation Maximization-type algorithm that can be described like this:
1. Get an initial guess of $w_0$ by, for example, $w_0$=AΛ$A^T\hat{x}$ and set $W_0$ appropriately.
2. Repeat from k=0 until converged:
   (a) Calculate $\hat{s}_k = W_k^{-1}\hat{x}$.
   (b) Calculate $w_{k+1} = f(\hat{s}_k)$ and set $W_{k+1}$ appropriately.
   (c) Increase k.

The last values $\hat{s}_k$ and $W_k$ are the final estimates of $\hat{s}$ and $\hat{W}$.

Typically, less than 20 iterations are necessitated for convergence

Different embodiments of the decoding apparatus 2 are also shown by FIG. 5 and FIG. 6. The decoding apparatus 2 of FIG. 5 is shown without the de-weighting. In FIG. 6 the approximation of the perceptual weighted model W is given and used for the de-weighting of the de-quantized spectrum $\hat{x}$. This highlights that the decoding includes the reconstruction of the model W based on the encoded signal.

To evaluate the performance of each part of the proposed system, the following experiments were performed.

Three versions of the input audio were compared:
the quantized and reconstructed signal, 1) without and 2) with perceptual modelling such that the perceptual is known at the decoder,
as well as 3) the perceptually quantized signal where the reconstruction is performed with the blindly estimated perceptual model according to the invention.

Figure 10:
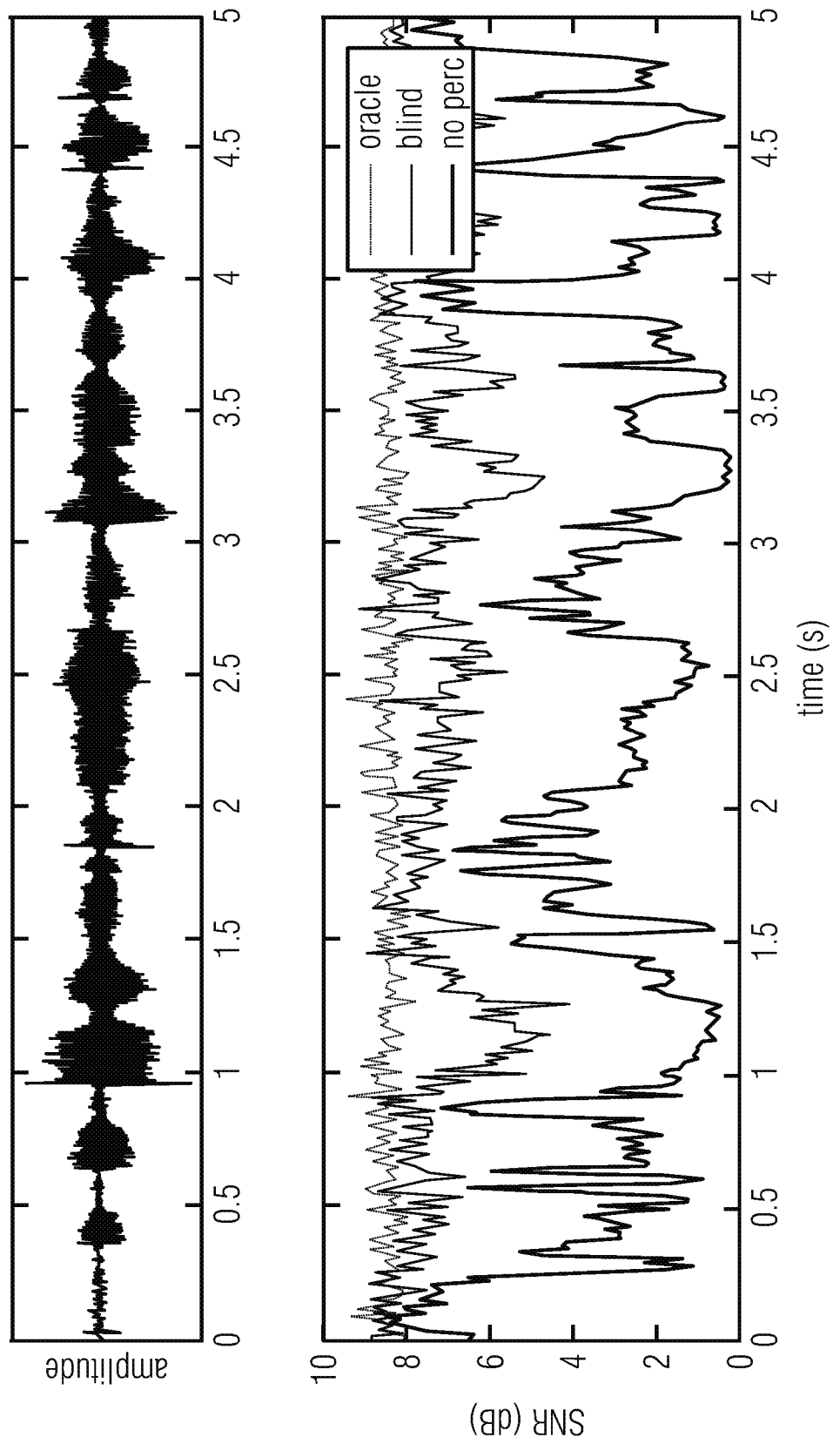
FIG. 10 shows signals belonging to a decoding process.

As test material random speech samples from the NTT-AT dataset [21] were used (see FIG. 10 upper row). The input signals were resampled to 12.8 kHz, the STFT was implemented with discrete cosine transform to obtain a real-valued spectrum and an envelope model was used with 20 bands, distributed according to the Mel-scale [20, 5].

As a first approximation of the perceptual model, the range-reduction function of $f(y)=y^p$ with p=0.5 was used. This perceptual model was chosen merely as a way to demonstrate the performance of blind reconstruction, and should not be considered as a tuned end-product. The performance of the envelope model as well as the perceptual model were already illustrated in FIG. 4.

First, the perceptual SNR for the quantization proposed without ($SNR_O$) and with blind reconstruction ($SNR_B$) of the perceptual model, respectively, will be estimated by:

$$SNR_O = \frac{\|x\|}{\|x - \hat{x}\|}, \quad (2)$$

and $$SNR_B = \frac{\|x\|}{\|x - W\hat{W}^{-1}\hat{x}\|}$$

FIG. 10 illustrates the perceptual SNR for a speech file quantized with the different methods (K=3000).

It is clear that when the perceptual model is known (oracle approach), the SNR is close to 8.4 dB. Blind reconstruction of the perceptual model clearly decreases quality (Blind) especially for voiced phonemes. However, the SNR of the system without a perceptual model (No perc) is more than twice worse than with blind recovery.

Figure 11:
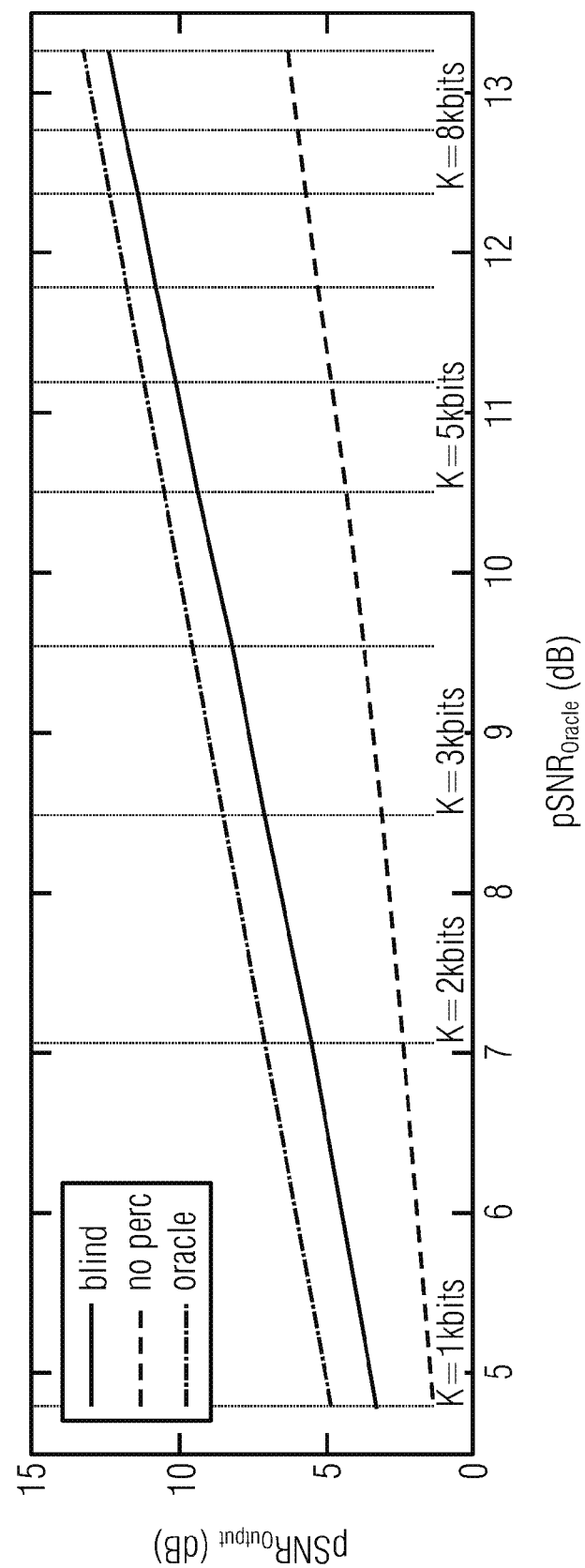
FIG. 11 shows mean SNR values with different bit-rates for experimental data.

To further quantify the advantage of blind reconstruction instead of no perceptual modelling, the mean SNR with different bit-rates K were measured (see FIG. 11).

The blind recovery and no-perceptual-model approaches are on average 1.1 dB and 5.8 dB worse than the oracle approach. Clearly SNR improves with bit-rate, though the no-perceptual-model case improves slower than with a perceptual model. Moreover, with increasing SNR, the blind recovery approaches the quality of the oracle approach asymptotically.

Finally, to evaluate subjective quality, a MUSHRA listening test was performed with eight listeners and six randomly chosen items from the NTT-AT dataset. The signal was quantized with 3 kbits/frame. That is a relatively low number given that no source modelling was used for the experiments, whereby output SNR is also relatively low. This scenario was chosen to demonstrate a problematic condition and performance is expected to improve significantly at higher bit-rates as well as when applying a source model.

Figure 12:
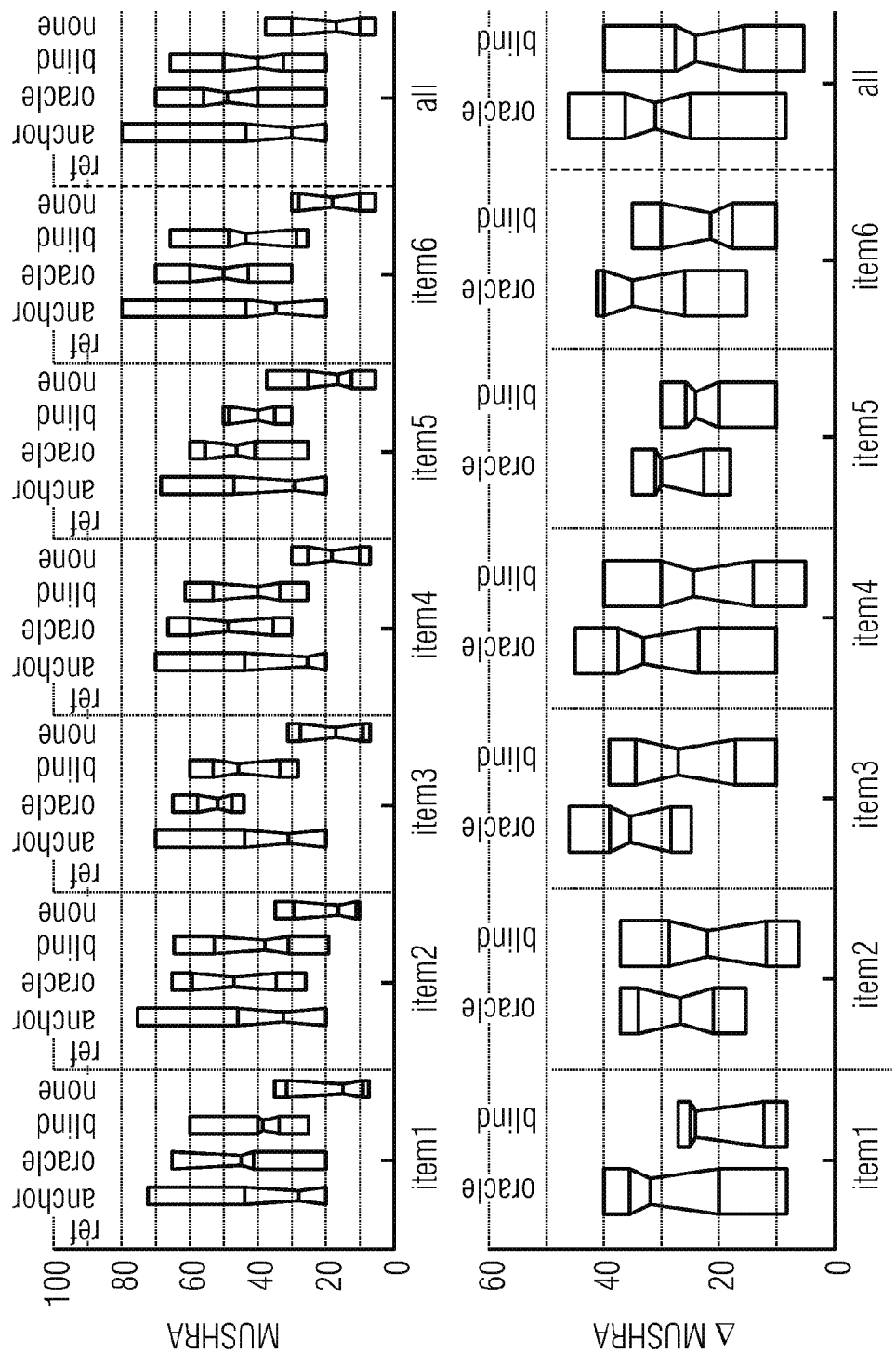
FIG. 12 shows differential MUSHRA scores for experimental data.

From the differential MUSHRA scores in FIG. 12, it can be seen that for all items, perceptual modelling improves quality with both the oracle and blind estimation, by 29.9 and 22.3 points on average, respectively. The statistical significance of the differences were confirmed with Student's t-test at p>99%.

The proposed 1 bit quantization and coding scheme—either combined in one embodiment or in separate embodiments—have several interesting consequences and properties.

Firstly, for analyzing quantization properties, note that each column of P is a projection to a 1-dimensional subspace of the N-dimensional space of vector x.

By encoding the sign of one projection, the N-dimensional space is split into two parts. By repeatedly encoding signs of Px, the N-dimensional space is split into ever smaller quantization cells. Since P is a random matrix, its columns are approximately orthogonal to each other, whereby the quantization cells remain near-optimal.

In a single node-system, a quantization approach may be designed which is more efficient.

However, in a distributed system it gets more complicated—a simple method is needed to prevent nodes from encoding the same information, that is, over-coding has to be avoided while retaining a low algorithmic complexity. The inventive quantization is very simple and provides near-optimal performance.

Secondly, source coding methods were not employed.

It is however well-known that such modelling can be used to improve coding efficiency significantly. Source modelling can be applied at the decoder side by modelling the probability distribution of speech and audio signals (e.g. [22]). Source modelling is possible, since the quantized signal can be treated as a noisy observation of the "true" signal, whereby, by applying a prior distribution of the source, maximum likelihood optimization (or similar) can be applied to approximate the "true" signal. Since this optimization is applied in the network or at the decoder, the computational load is kept away from the sensor-nodes and the sensor-nodes can remain low-power.

Thirdly, from a privacy perspective, the random projection method can be designed to be a highly efficient encryption.

If an eavesdropper does not know the seed for the random matrix, then the data will seem entirely random and meaningless. Assuming that the random seed is communicated in a secure manner, then only the encoder and the intended receiver can decrypt a message. This approach is in contrast to approaches such as given by [12, 13], where communication between nodes is intentionally employed. While such collaboration between nodes can be used to improve perceptual SNR, privacy is more difficult to guarantee. Even when assuming that sensor-nodes are operating over a secure network, it can take only one compromised node to gain access to all communications. In the proposed approach, in contrast, if an eavesdropper gains access to one sensor node, it compromises the data of that node only, since nodes can and should use different seeds. To limit the transmission power of sensor nodes, it can however be allowed that nodes relay packets, since packets remain readable by the intended recipient only and privacy is thus not compromised.

The inventive method is based in one embodiment on a 1 bit quantization idea, where on the encoder side, the perceptually weighted input signal is projected to random sub-spaces, and where the sign of each dimension is then transmitted. The decoder can invert the quantization with a pseudo-inverse, or similar, to obtain the quantized perceptually weighted signal.

The main part of the proposed method is then reconstruction of an estimate of the original signal, when we have access only to the perceptually weighted signal. The approach is based on an estimation-maximization (EM) algorithm, where it is iteratively alternated between estimating the perceptual model and the original signal.

The proposed distributed speech and audio coding algorithm is thus a viable approach for applications for the internet of things. It offers scalable performance for any number of sensor nodes and level of power consumption. Moreover, the algorithm is secure by design, since privacy of the communication channel can be guaranteed by encrypted communication of the random seed.

The presented invention includes at least the following features, aspects, as well as obvious applications and extensions. The listing, thus, refers to different embodiment and allows different combinations of the mentioned features.

1. Distributed speech and audio coding system with one or several encoders, which can be implemented on, scalable, flexible, low-power and low-cost processors with limited transmission and computational capacity and other resources.
   1.1. Distributed encoders can be configured to encode information such that the information from each encoder node can independently quantized such that amount of information from a collection of nodes can be maximized, for example,
      1.1.1. by making each encoder node encode information which is orthogonal or approximately orthogonal to the other nodes,
      1.1.2. by using randomized quantization algorithms, which may or may not be orthogonal or approximately orthogonal to the other nodes,
      1.1.3. by using entropy coding methods to compress quantized information.
   1.2. Distributed encoders can be configured to encode information in a perceptual domain, which approximates the perceptual accuracy of the human hearing system
      1.2.1. where the transformation to the perceptual domain can be designed to be reversible, such that encoder nodes can (blindly) recover the perceptual model without explicit transmission of the perceptual model,
      1.2.2. where some or all parameters of the perceptual models can be explicitly transmitted from some or all encoder nodes as side information.
      1.2.3. where the perceptual models can be described using envelope models, such as linear predictive models, filter banks, matrix transforms, or scale factor bands (piece-wise constant or interpolated), and they can be implemented as matrix operations or filtering operations.
      1.2.4. where the perceptual models can have constant and adaptive parts, where constant parts are the same, and adaptive parts are dependent on the input signal and/or the configuration of the system and/or the amount of resources (hardware, computation, transmission, battery capacity etc.) available.
   1.3. Distributed encoders can be configured to encode information such that the quantization error is minimized in a perceptual domain, for example, like the analysis-by-synthesis loop in CELP-type codecs.
   1.4. Distributed encoders can be configured to encode information using encryption to prevent eavesdropping by for example
      1.4.1. encrypting the final or intermediate signal description before transmission using methods which are algorithmic or based on table-look-ups,
      1.4.2. by using quantization with randomization, such as random transforms or projections, where the randomization is achieved by an algorithm or table-look-up with a known seed value (starting point).
   1.5. Distributed encoders whose configuration can be flexible and modified on-line, for example,
      1.5.1. based on location and movement of audio sources (such as human speakers), sensor nodes, as well as availability of resources, sensor nodes can decide independently or jointly which nodes are active or inactive,
      1.5.2. based on location and movement of audio sources (such as human speakers), sensor nodes, as well as availability of resources, sensor nodes can decide independently or jointly adjust resource allocation, for example, such that a sensor node with a microphone near a speaker uses more resources than those further away.
   1.6. A special case of the proposed system is when there is only a single encoder, whereby the system reduces to follow the classical architecture of speech and audio codecs. Importantly, however, the random quantization and blind recovery of the perceptual model-aspects of the current invention can be used also in the classical encoder&decoder design, for example, for the benefit of coding efficiency, to obtain a low-complexity encoder, and for encryption of the communication.
2. Distributed speech and audio coding system where the input from the encoders is merged at one or several network nodes (using in-network processing methods) or at one or several decoder/receiver nodes.
   2.1. Decoder or processing units can be configured to invert quantization by for example
      2.1.1. exact inverse transform, pseudo-inverse, or an approximated inverse such as the transpose of a random matrix,
      2.1.2. estimating the input signal by optimization methods, such as compressive sensing,
      2.1.3. bit-streams $u_k$ from nodes $k \in [1, 2, \ldots, n]$ can be merged by a joint-inversion such as $$\hat{x} = \begin{bmatrix} P_1 \\ P_2 \\ \ldots \\ P_n \end{bmatrix}^{\dagger} \begin{bmatrix} u_1 \\ u_2 \\ \ldots \\ u_n \end{bmatrix}$$

or the bit-streams can be first inverted $\hat{x}_k = P_k^{\dagger} u_k$ and only afterwards merged. The benefit of the latter is that we can then apply modelling, such as perceptual, source, spatial and sensor-models separately or jointly on each node.
   2.2. Decoder or processing units can be configured to invert the perceptual model by using transmitted side-information and/or by blindly estimating it from the reconstructed (perceptual) signal by for example
      2.2.1. direct methods, where the perceptual model is obtained directly from the quantized signal,
      2.2.2. iterative methods, where the estimate of the perceptual model is successively improved iteration by iteration.
   2.3. Decoder or processing units can be configured to use source and sensor-node models to improve the quality of the decoded signal.
      2.3.1. By modelling statistical properties of source signals and sensor nodes, we can optimize the likelihood of observation (the quantized signal) given the prior distribution of the signal and/or source.
         2.3.1.1. The modelled source features can include one or several spectral envelope models (linear predictive models, distribution quantization, scale factors etc.), harmonic models (comb filters, long time predictors etc.), temporal envelopes (linear predictive models, distribution quantization, scale factors etc.), spatial envelopes and spatial movement models.
         2.3.1.2. The features can be modelled with table-lookups such as codebooks or vector quantization, or with parametric models such as physical (speech production etc.), perceptual (masking models, critical bands etc.) or statistical models (uni- or multivariate probability distributions).
         2.3.1.3. The features can describe acoustic and spatial features of the sources, but also features of the sensor-nodes, such as signal quality (e.g. high or low SNR) and spatial features (e.g. stationary, moving, wearable, etc.).
      2.3.2. By determining perceptually annoying distortions of the output signal, we can modify the output signal by, for example, post-filtering methods.
   2.4. Decoder or processing units can be configured to use signal enhancement methods such as noise attenuation, beamforming and source separation methods to enhance signal quality.
      2.4.1. Multimicrophone methods such as beamforming can be employed to take advantage of the spatial configuration of sensors to extract spatially separated sound sources and other information about the room acoustics. Importantly, multimicrophone methods can typically include delay estimation and/or cross-correlation estimation.
      2.4.2. Noise attenuation methods can be used to suppress undesirable sources such as background noise.
      2.4.3. Source separation methods can be used to distinguish between several sound sources.
3. Distributed speech and audio coding system where the information of the signal information can be transmitted, relayed and processed by a selection of devices/nodes in the system.
   3.1. Sensor-nodes (devices with sensors) receive the raw signal and can be configured to either encode (quantize and code) the signal or transmit it in a raw format.
   3.2. Any node (typically the sensor-node) which has access to a raw signal can encode the signal and transmit it.
   3.3. Any node can be configured to relay information from other nodes.
   3.4. Any node (typically a receiver node) which has access to an encoded signal (and the optional encryption-decoding information), can be configured decode the signal.
   3.5. An intermediate node, such as server-device at the decoder side, can be configured to merge information from available streams into one or several streams. The combined stream(s) may represent for example the original acoustic representation (such as a music performance) or individual sound sources (such as individual speakers in a teleconference). The combined stream can be further reproduced by loudspeakers, stored, transmitted as such or encoded by the same or some other speech and audio coding tool.
   3.6. The network configuration can configured to be static or dynamic, such that it optimizes for example, one or several of the following criteria; sound quality, resource allocation, security/privacy.
4. The envisioned applications include at least
   4.1. Telephone applications, where a selection of supporting devices is used to pick up the desired speech and audio signal(s).
      4.1.1. In-home and -office applications, where a selection of supporting devices are used to pick up the desired speech and audio signal(s) and transmitted to one or several remote locations.
      4.1.2. Teleconferencing applications, where a selection of supporting devices are used to pick up the desired speech and audio signal(s) and transmitted to one or several remote locations.
      4.1.3. Car-phone systems, where fixed microphones in the car and/or supporting devices within the car are used to pick up the desired speech and audio signal(s) and transmitted to one or several remote locations.

4.2. Gaming and virtual/augmented reality applications, where the sound scene of a player is transmitted to other players or a server.

4.3. Concert, performance, stage, opera, presentation, sporting, and other event production applications, where sounds of the performers, players, audience or overall sound scene is recorded or transmitted with a distributed speech and audio coding system.

4.3.1. The application can be designed to be low or ultra-low delay to enable interaction and/or simultaneous playback and amplification.

4.3.2. The application can be designed to allow interaction between performers, within the audience, or between all participants.

4.4. Safety and security applications, where a sound scene is monitored to detect dangerous events (e.g. panic at a stadium), accidents at home (e.g. an elderly person falling) etc.

4.5. Multimedia applications, where speech and audio signals are combined with video and/or other media.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] TS 26.445, EVS Codec Detailed Algorithmic Description; 3GPP Technical Specification (Release 12), 3GPP, 2014.

[2] TS 26.190, Adaptive Multi-Rate (AMR-WB) speech codec, 3GPP, 2007.

[3] ISO/IEC 23003-3:2012, "MPEG-D (MPEG audio technologies), Part 3: Unified speech and audio coding," 2012.

[4] M. Bosi, K. Brandenburg, S. Quackenbush, L. Fielder, K. Akagiri, H. Fuchs, and M. Dietz, "ISO/IEC MPEG-2 advanced audio coding," Journal of the Audio engineering society, vol. 45, no. 10, pp. 789-814, 1997.

[5] M. Bosi and R. E. Goldberg, Introduction to Digital Audio Coding and Standards. Dordrecht, The Netherlands: Kluwer Academic Publishers, 2003.

[6] P. T. Boufounos and R. G. Baraniuk, "1-bit compressive sensing," in Information Sciences and Systems, 2008. CISS 2008. 42nd Annual Conference on. IEEE, 2008, pp. 16-21.

[7] Z. Xiong, A. D. Liveris, and S. Cheng, "Distributed source coding for sensor networks," IEEE Signal Process. Mag., vol. 21, no. 5, pp. 80-94, 2004.
[8] Z. Xiong, A. D. Liveris, and Y. Yang, "Distributed source coding," Handbook on Array Processing and Sensor Networks, pp. 609-643, 2009.
[9] B. Girod, A. M. Aaron, S. Rane, and D. Rebollo-Monedero, "Distributed video coding," Proc. IEEE, vol. 93, no. 1, pp. 71-83, 2005.
[10] A. Majumdar, K. Ramchandran, and L. Kozintsev, "Distributed coding for wireless audio sensors," in Applications of Signal Processing to Audio and Acoustics, 2003 IEEE Workshop on. IEEE, 2003, pp. 209-212.
[11] H. Dong, J. Lu, and Y. Sun, "Distributed audio coding in wireless sensor networks," in Computational Intelligence and Security, 2006 International Conference on, vol. 2. IEEE, 2006, pp. 1695-1699.
[12] A. Zahedi, J. Østergaard, S. H. Jensen, P. Naylor, and S. Bech, "Coding and enhancement in wireless acoustic sensor networks," in Data Compression Conference (DCC), 2015. IEEE, 2015, pp. 293-302.
[13] A. Zahedi, J. Østergaard, S. H. Jensen, S. Bech, and P. Naylor, "Audio coding in wireless acoustic sensor networks," Signal Processing, vol. 107, pp. 141-152, 2015.
[14] U.S. Pat. No. 7,835,904.
[15] G. Kubin and W. B. Kleijn, "Multiple-description coding (MDC) of speech with an invertible auditory model," in Speech Coding, IEEE Workshop on, 1999, pp. 81-83.
[16] V. K. Goyal, "Multiple description coding: Compression meets the network," IEEE Signal Process. Mag., vol. 18, no. 5, pp. 74-93, 2001.
[17] J. O. Smith III and J. S. Abel, "Bark and ERB bilinear transforms," IEEE Trans. Speech Audio Process., vol. 7, no. 6, pp. 697-708, 1999.
[18] T. Bäckström, "Vandermonde factorization of Toeplitz matrices and applications in filtering and warping," IEEE Trans. Signal Process., vol. 61, no. 24, pp. 6257-6263, December 2013.
[19] F. Zheng, G. Zhang, and Z. Song, "Comparison of different implementations of MFCC," Journal of Computer Science and Technology, vol. 16, no. 6, pp. 582-589, 2001.
[20] H. Fastl and E. Zwicker, Psychoacoustics: Facts and models. Springer, 2006, vol. 22.
[21] NTT-AT, "Super wideband stereo speech database," http://www.ntt-at.com/product/widebandspeech, accessed: 09.09.2014. [Online]. Available: http://www.ntt-at.com/product/widebandspeech
[22] S. Korse, T. Jähnel, and T. Bäckström, "Entropy coding of spectral envelopes for speech and audio coding using distribution quantization," in Proc. Interspeech, 2016.

The invention claimed is:

1. An encoding apparatus for processing an input signal, comprising:
a perceptual weighter; and
a quantizer,
wherein the perceptual weighter comprises a model provider and a model applicator, wherein the model provider is configured for providing a perceptually weighted model based on the input signal, and wherein the model applicator is configured for providing a perceptually weighted spectrum by applying the perceptually weighted model to a spectrum based on the input signal, and
wherein the quantizer is configured to quantize the perceptually weighted spectrum and for providing a bitstream, wherein the quantizer comprises a random matrix applicator and a sign function calculator, wherein the random matrix applicator is configured for applying a random matrix to the perceptually weighted spectrum in order to provide a transformed spectrum, and wherein the sign function calculator is configured for calculating a sign function of components of the transformed spectrum in order to provide the bitstream.

2. The encoding apparatus of claim 1, wherein the model provider is configured for providing the perceptually weighted model based on a compression of the spectrum based on the input signal.

3. The encoding apparatus of claim 1,
wherein the perceptual weighter comprises an envelope calculator,
wherein the envelope calculator is configured for providing an envelope of a magnitude spectrum based on the input signal, and
wherein the model provider is configured for providing the perceptually weighted model based on a compression of the envelope.

4. The encoding apparatus of claim 1,
wherein the model provider is configured for calculating a compression function describing a compression of the spectrum based on the input signal or of an envelope of a magnitude spectrum based on the input signal, and
wherein the model provider is configured for calculating the perceptually weighted model based on the compression function.

5. The encoding apparatus of claim 4,
wherein the compression function is strictly increasing,
where for any positive scalar value and an arbitrarily small value the function value for the positive scalar value is smaller than the function value for the sum of the positive scalar value and of the arbitrarily small value, and
wherein for a first positive scalar value and a second positive scalar value greater than the first positive scalar value, a difference between the function value for the second positive scalar value and the function value for the first positive scalar value is smaller than a difference between the second positive scalar value and the first positive scalar value.

6. A decoding apparatus for processing an encoded signal, comprising:
a de-quantizer; and
a perceptual de-weighter,
wherein the de-quantizer is configured to de-quantize a bitstream comprised by the encoded signal and for providing a calculated perceptually weighted spectrum,
wherein the de-quantizer is configured to de-quantize the bitstream by applying a pseudo-inverse of a random matrix to the bitstream, and
wherein the perceptual de-weighter comprises a spectrum approximator and a model approximator, wherein the spectrum approximator is configured for calculating an approximation of a spectrum based on the calculated perceptually weighted spectrum, and wherein the model approximator is configured for calculating an approximation of a perceptually weighted model with which the encoded signal is associated based on the approximation of the spectrum.

7. The decoding apparatus of claim 6,
wherein the perceptual de-weighter comprises an initial guess provider,
wherein the initial guess provider is configured for providing data for an initial guess of the perceptual weighted model, and
wherein the spectrum approximator is configured for calculating the approximation of the spectrum based on the encoded signal and the initial guess or the approximation of the perceptually weighted model.

8. The decoding apparatus of claim 6, wherein the de-quantizer is configured to de-quantize the bitstream based on side-information about the random matrix comprised by the encoded signal.

9. The decoding apparatus of claim 6, wherein the de-quantizer is configured to receive a plurality of bitstreams and to provide a calculated perceptually weighted spectrum based on the plurality of bitstreams.

10. The decoding apparatus of claim 6, wherein the decoding apparatus is configured to apply source modelling.

11. A method for encoding an input signal, comprising:
providing a perceptual weighting model based on the input signal;
weighting a spectrum of the input signal by applying the perceptual weighting model to the spectrum of the input signal; and
quantizing the weighted spectrum by calculating a sign function of random projections of the weighted spectrum,
wherein the method further comprises acquiring the random projections of the weighted spectrum by applying a random matrix to the weighted spectrum, or
wherein the providing the perceptual weighting model comprises compressing an envelope of a magnitude spectrum of the input signal, wherein the acquiring the envelope is performed by using a filterbank and a diagonal matrix comprising normalization factors for each band,
wherein one or more of the providing, the weighting, and the quantizing is implemented, at least in part, by one or more hardware elements of a signal processing device.

12. A method for processing decoding an encoded signal, comprising:
providing a quantized perceptual signal by applying a pseudo-inverse of a random matrix to the encoded signal;
calculating an estimation of a spectrum based on the quantized perceptual signal; and
calculating an approximation of a perceptual weighting model used for providing the encoded signal based on the approximation of the spectrum,
wherein the method further comprises:
providing a zero-th approximation of the perceptual weighting model using an initial guess, and
calculating a zero-th estimation of the spectrum based on the zero-th approximation of the perceptual weighting model,
wherein one or more of the providing a quantized perceptual signal, the calculating an estimation, the calculating an approximation, the providing a zero-th approximation of the perceptual weighting model, and the calculating a zero-th estimation of the spectrum is implemented, at least in part, by one or more hardware elements of a signal processing device.

13. The method of claim 12, further comprising:
acquiring the initial guess by using a filterbank and a diagonal matrix comprising normalization factors for each band.

14. A non-transitory digital storage medium having stored thereon a computer program for performing, when said computer program is run by a computer, a method for encoding an input signal, the method comprising:
providing a perceptual weighting model based on the input signal;
weighting a spectrum of the input signal by applying the perceptual weighting model to the spectrum of the input signal; and
quantizing the weighted spectrum by calculating a sign function of random projections of the weighted spectrum,
wherein the method further comprises acquiring the random projections of the weighted spectrum by applying a random matrix to the weighted spectrum, or
wherein the providing the perceptual weighting model comprises compressing an envelope of a magnitude spectrum of the input signal, wherein the acquiring the envelope is performed by using a filterbank and a diagonal matrix comprising normalization factors for each band.

15. A non-transitory digital storage medium having stored thereon a computer program for performing, when said computer program is run by a computer, a method for decoding an encoded signal, the method comprising:
providing a quantized perceptual signal by applying a pseudo-inverse of a random matrix to the encoded signal;
calculating an estimation of a spectrum based on the quantized perceptual signal; and
calculating an approximation of a perceptual weighting model used for providing the encoded signal based on the approximation of the spectrum
wherein the method further comprises:
providing a zero-th approximation of the perceptual weighting model using an initial guess, and
calculating a zero-th estimation of the spectrum based on the zero-th approximation of the perceptual weighting model.

16. An encoding method for processing an input signal, comprising:
perceptually weighting; and
quantizing,
wherein the perceptually weighting comprises providing a model and applying the model, wherein the providing the comprises providing a perceptually weighted model based on the input signal, and wherein the applying the model comprises providing a perceptually weighted spectrum by applying the perceptually weighted model to a spectrum based on the input signal, and
wherein the quantizing comprise quantizing the perceptually weighted spectrum and providing a bitstream, wherein the quantizing the perceptually weighted spectrum comprises applying a random matrix and calculating a sign function calculator, wherein the applying the random matrix comprises applying a random matrix to the perceptually weighted spectrum in order to provide a transformed spectrum, and wherein the calculating the sign function comprises calculating a sign function of components of the transformed spectrum in order to provide the bitstream.

17. A non-transitory digital storage medium having stored thereon a computer program for performing, when said computer program is run by a computer, an encoding method for processing an input signal, the encoding method comprising:

perceptually weighting; and
quantizing,
wherein the perceptually weighting comprises providing a model and applying the model, wherein the providing the comprises providing a perceptually weighted model based on the input signal, and wherein the applying the model comprises providing a perceptually weighted spectrum by applying the perceptually weighted model to a spectrum based on the input signal, and
wherein the quantizing comprise quantizing the perceptually weighted spectrum and providing a bitstream, wherein the quantizing the perceptually weighted spectrum comprises applying a random matrix and calculating a sign function calculator, wherein the applying the random matrix comprises applying a random matrix to the perceptually weighted spectrum in order to provide a transformed spectrum, and wherein the calculating the sign function comprises calculating a sign function of components of the transformed spectrum in order to provide the bitstream.

18. A decoding method for processing an encoded signal, comprising:

de-quantizing; and
perceptually de-weighting,
wherein the de-quantizing comprise de-quantizing a bitstream comprised by the encoded signal and providing a calculated perceptually weighted spectrum, wherein the de-quantizing the bitstream comprises de-quantizing the bitstream using applying a pseudo-inverse of a random matrix to the bitstream, and
wherein the perceptually de-weighting comprises performing a spectrum approximation and performing a model approximation, wherein the performing the spectrum approximation comprises calculating an approximation of a spectrum based on the calculated perceptually weighted spectrum, and wherein the performing the model approximation comprises calculating an approximation of a perceptually weighted model with which the encoded signal is associated based on the approximation of the spectrum.

19. A non-transitory digital storage medium having stored thereon a computer program for performing, when said computer program is run by a computer, A decoding method for processing an encoded signal, the method comprising:

de-quantizing; and
perceptually de-weighting,
wherein the de-quantizing comprise de-quantizing a bitstream comprised by the encoded signal and providing a calculated perceptually weighted spectrum, wherein the de-quantizing the bitstream comprises de-quantizing the bitstream using applying a pseudo-inverse of a random matrix to the bitstream, and
wherein the perceptually de-weighting comprises performing a spectrum approximation and performing a model approximation, wherein the performing the spectrum approximation comprises calculating an approximation of a spectrum based on the calculated perceptually weighted spectrum, and wherein the performing the model approximation comprises calculating an approximation of a perceptually weighted model with which the encoded signal is associated based on the approximation of the spectrum.

* * * * *